United States Patent
Pan et al.

(10) Patent No.: US 7,787,675 B2
(45) Date of Patent: Aug. 31, 2010

(54) SYSTEM, PROGRAM PRODUCT, AND METHODS FOR ATTENUATION CORRECTION OF EMISSION DATA ON PET/CT AND SPEC/CT

(75) Inventors: Tinsu Pan, Houston, TX (US); Osama Mawlawi, Houston, TX (US); Dershan Luo, Houston, TX (US); Steven G. Kohlmyer, Lynnwood, WA (US); Dennis P. Hurley, Waukesha, WI (US)

(73) Assignees: General Electric Company, Schenectady, NY (US); Board Of Regents, The University of Texas System, Austin, TX (US)

( * ) Notice: Subject to any disclaimer, the term of this patent is extended or adjusted under 35 U.S.C. 154(b) by 1024 days.

(21) Appl. No.: 11/384,029

(22) Filed: Mar. 17, 2006

(65) Prior Publication Data

US 2007/0081704 A1    Apr. 12, 2007

Related U.S. Application Data

(60) Provisional application No. 60/662,732, filed on Mar. 17, 2005.

(51) Int. Cl.
*G06K 9/00* (2006.01)
*A61B 6/00* (2006.01)

(52) U.S. Cl. .......................... 382/128; 378/4
(58) Field of Classification Search ................ 382/128, 382/129, 130, 131, 132, 133, 134; 378/4, 378/21–27, 46, 90, 92, 98.4, 98.6, 98.9, 101, 378/140, 901; 424/9.4; 250/363.04, 370.09; 600/317, 321, 425, 436, 407, 410
See application file for complete search history.

(56) References Cited

U.S. PATENT DOCUMENTS 6,490,476 B1* 12/2002 Townsend et al. ........... 600/427
2004/0081269 A1* 4/2004 Pan et al. .................... 378/4

OTHER PUBLICATIONS

Burger C, Goerres GW, Schoenes S, Buck A, Lonn AHR, von Schulthess GK. PET attenuation coefficients from CT images: experimental evaluation of the transformation of CT into PET 511-keV attenuation coefficients. *Eur J Nucl Med*. 2002; 29:922-927.

Beyer T, Antoch G, Mueller S, et al. Acquisition protocol considerations for combined PET/CT imaging. *J Nucl Med*. 2004; 45 (Suppl): 25S-35S.

(Continued)

*Primary Examiner*—Abolfazl Tabatabai
(74) *Attorney, Agent, or Firm*—ZPS Group, SC

(57) ABSTRACT

Embodiments of the present invention provide the use of average CT (ACT) to match the temporal resolution of CT and PET to enhance PET imaging and evaluated tumor quantification with HCT and ACT. For example, an embodiment of a method of enhanced PET imaging on a PET/CT scanner includes generating an average CT scan responsive to 4D CT emission image data to thereby correct attenuation in PET emission image data. Another embodiment of a method of attenuation correction in a PET/CT scan includes averaging a plurality of consecutive low dose CT images of approximately one breathing cycle to thereby obtain an average CT.

22 Claims, 17 Drawing Sheets

OTHER PUBLICATIONS

Osman MM, Cohade C, Nakamoto Y, Wahl RL. Respiratory motion artifacts on PET emission images obtained using CT attenuation correction on PET-CT. *Eur J Nucl Med Mol Imaging*. 2003;30:603-606.

Goerres GW, Kamel E, Heidelberg TN, Schwitter MR, Burger C, von Schulthess GK. PET-CT image co-registration in the thorax: influence of respiration. *Eur J Nucl Med Mol Imaging*. 2002; 29:361-360.

Beyer T, Antoch G, Blodgett T, Freudenberg LF, Akhurst T, Mueller S, Dual-modality PET/CT imaging: the effect of respiratory motion on combined image quality in clinical oncology. *Eur J Nucl Med Mol Imaging*. 2003; 30:588-596.

Nehmeh SA, Erdi YE, Pan T, et al. Quantitation of respiratory motion during 4D-PET/CT acquisition acquisition, *Med Phys*. 2004; 31:1333-1338.

Pan T, Lee TY, Rietz E, Chen GTY. 4D-CT imaging of a volume influenced by respiratory motion on multi-slice CT. *Med Phys*. 2004; 31:333-340.

Pan T. Comparison of helical and cine acquisitions for 4D-CT imaging with multi-slice CT. *Med Phys*. 2005; 32:627-634.

R. Underberg, F. Lagerwaard, J. Cuijpers, B. Slotman, J. van Sornsen DE Koste, and S. Senan, "Four-dimensional CT scans for treatment planning in stereotactic radiotherapy for stage I lung cancer," Int. J. Radiation Oncology Biol. Phys., vol. 60, No. 4, pp. 1283-1290, 2004.

* cited by examiner

FIG. 5
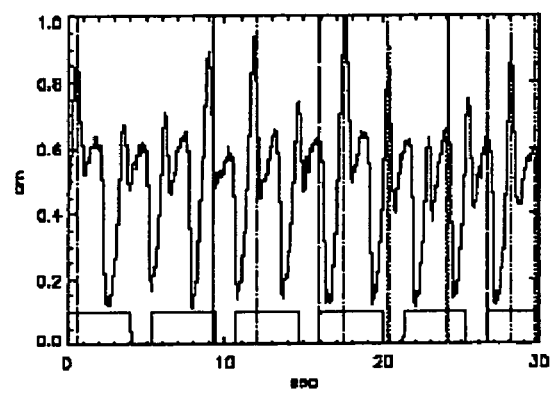
(a)
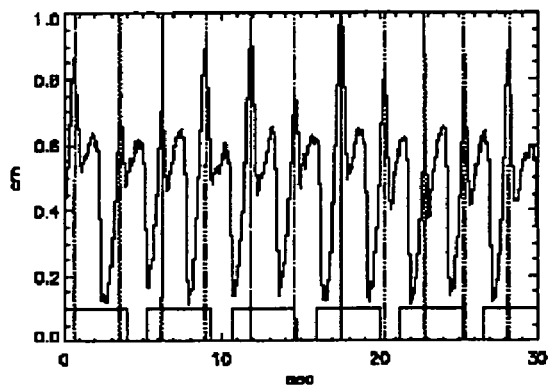
(b)
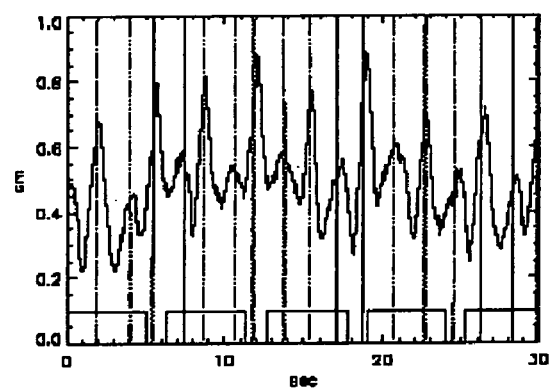
(c)
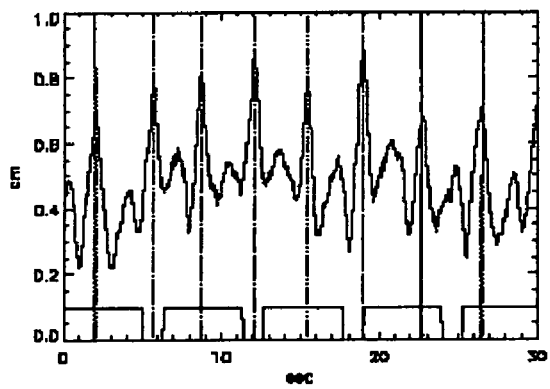
(d)

FIG. 6

|  | Cine 4D | | | | Helical 4D | | | |
|---|---|---|---|---|---|---|---|---|
| System | RT | Plus | Ultra | 16 | RT | Plus | Ultra | 16 |
| Fastest revolution (s) | 1 | 0.5 | 0.5 | 0.5 | 1 | 0.5 | 0.5 | 0.5 |
| Number of slices | 4 | 4 | 8 | 16 | 4 | 4 | 8 | 16 |
| Pitch factor | n.a. | n.a. | n.a. | n.a. | 0.214 | 0.115 | 0.115 | 0.115 |
| Slice collimation (mm) | 2.5 | 2.5 | 2.5 | 1.25 | 2.5 | 2.5 | 2.5 | 1.25 |
| SSP (mm) | 2.5 | 2.5 | 2.5 | 1.25 | 4.5 | 4.5 | 4.5 | 2.3 |
| Acq. time per step (s) | 4.7 | 4.3 | 4.3 | 4.3 | n.a. | n.a. | n.a. | n.a. |
| Number of acq. steps | 20 | 20 | 10 | 10 | n.a. | n.a. | n.a. | n.a. |
| Time between steps (s) | 1.3 | 1.3 | 1.3 | 1.3 | n.a. | n.a. | n.a. | n.a. |
| Scan time (s) | 118 | 111 | 55 | 55 | 101 | 95 | 51 | 51 |
| Overscan time (s) | 0 | 0 | 0 | 0 | 4 | 4 | 4 | 4 |
| Dose efficiency (%) | 100 | 100 | 100 | 100 | 96 | 96 | 92 | 92 |

Table 1: Comparison of the cine and helical 4D-CT's in scan time, SSP, and dose efficiency in a 4-s breathing cycle and half-scan reconstruction for the LightSpeed RT, Plus, Ultra, and 16 MSCT scanners. The "n.a." is "not available".)

TABLE 1

The quantification results of the same PET data by HCT and ACT.

| Patient no. | 1 | 2 | | | 3 | 4 | | 5 | | 6 | | 7 | 8 |
|---|---|---|---|---|---|---|---|---|---|---|---|---|---|
| Tumor no. | 1 | 2 | 3 | 4 | 5 | 6 | 7 | 8 | 9 | 10 | 11 | 12 | 13 |
| SUV (HCT) | 2.3 | 2.6 | 11.8 | 10.8 | 3.9 | 6.8 | 6.6 | 4.6 | 3.4 | 4.3 | 1.9 | 7.7 | 9.3 |
| SUV (ACT) | 3.6 | 3.1 | 12.2 | 13.7 | 3.7 | 6.3 | 8.4 | 7.5 | 4.3 | 7.4 | 3.8 | 9.8 | 10.9 |
| SUV difference (%) | 59.0 | 17.4 | 3.6 | 26.9 | -4.7 | -7.6 | 27.4 | 62.1 | 28.5 | 70.1 | 97.4 | 27.3 | 17.2 |

The shaded columns indicate the four tumors with an SUV difference greater than 50%.

FIG. 11

FIG. 13
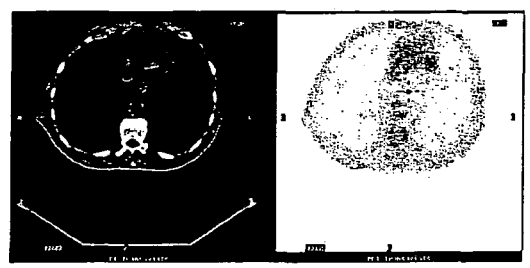
A
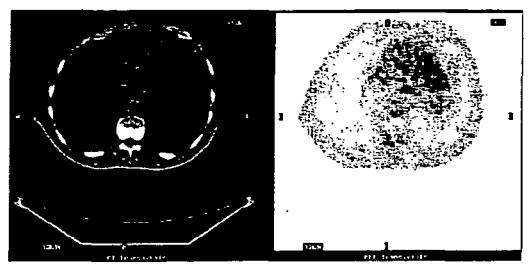
B
C
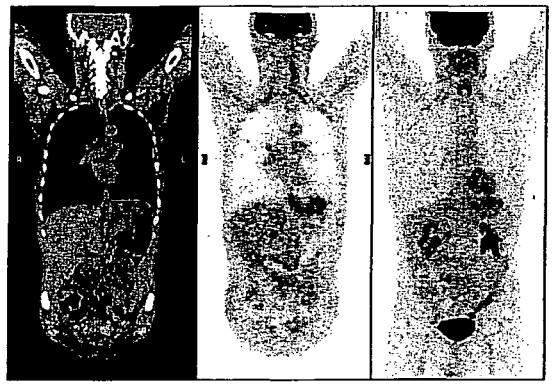
D

A　　　　　　　　　　　B

A					B

A            B

A B C D

SYSTEM, PROGRAM PRODUCT, AND METHODS FOR ATTENUATION CORRECTION OF EMISSION DATA ON PET/CT AND SPEC/CT

RELATED APPLICATIONS

This application claims priority to and the benefit of U.S. Provisional Application No. 60/662,732, filed on Mar. 17, 2005, incorporated herein by reference in its entirety.

BACKGROUND OF THE INVENTION

1. Field of the Invention

The present invention relates generally to the field of medical imaging and, more particularly, to attenuation correction of images.

2. Description of Related Art

A Positron Emission Tomography (PET)/Computed Tomography (CT) or a Single-Photon Emission Computed Tomography (SPECT)/CT scanner can be an important tool for tumor imaging. It can provide both anatomical and functional information in a single imaging session and also accurate registration of PET and CT data to improve the diagnosis of tumors. Additionally, the high-performance and high-throughput multi-slice CT has also replaced the transmission rod sources to obtain an attenuation map for quantification of PET emission data. The scan time using transmission rod sources is several minutes for only 15 cm of coverage, but this is reduced to only about 30 seconds of CT scan time for 100 cm of coverage using high-throughput multi-slice CT. A PET/CT scan, thus, typically takes less than 30 minutes instead of more than an hour as with a stand-alone PET scanner.

Applicants recognized that a potential issue has emerged from the mismatch of CT and PET data caused by the difference of temporal resolution between CT (<1 sec) and PET scans, however. In a PET/CT scan, for example, a helical CT (HCT) scan is normally performed before the PET scan to obtain the CT-based attenuation map for the attenuation correction (AC) of the PET data and provide anatomical information to improve localization of the PET images. Performing CT before PET allows the PET data to be reconstructed with AC before the patient leaves the scanner and ensures the integrity of data acquisition. To match the CT and the PET data, patients are asked during the HCT scan to either hold their breath at mid-expiration or take a shallow breath. Misalignment of the HCT and the PET data has been reported with both techniques and may become an issue in imaging the thorax, such as where the breath-hold state in HCT is different from the free-breathing state in PET. The end results are a mismatch of tumor location between the HCT and PET scans and an inaccurate quantification of tumors in PET images.

Commercial PET/CT and SPECT/CT scanners with high performance multi-slice CT have a deficiency in imaging the thorax and the abdomen over which the cardiac and respiratory motion may compromise the quantification and localization of the lesions imaged by PET/CT and SPECT/CT.

SUMMARY OF THE INVENTION

Applicants recognized this need and examined the temporal and spatial resolutions of CT and PET. CT images have a temporal resolution less than 1 second and an in-plane spatial resolution of less than 1 millimeter (mm), whereas PET images have a temporal resolution of many breathing cycles and a spatial resolution of greater than 5 mm. Blurring of CT images is a necessary step for obtaining the CT-based attenuation maps for the AC, attenuation correction, of PET data, as is scaling of the lower-energy attenuation coefficients in the CT images to the attenuation coefficients of 511 keV for the AC of PET images. Efforts to match the temporal resolution of CT and PET have led to the development of methods that gate the PET data and the CT data, such as the four-dimensional (4D)-PET/CT.

The quantification and resolution of PET images can be improved with gating. Gated PET, however, normally takes a long time to obtain sufficient data in each gated phase or bin. Gated PET may also require that each phase of the gated PET data be matched with the corresponding phase of the CT data for quantification of the PET data. On the basis of experience with 4D-PET/CT studies, however, most tumors in PET imaging during which the patients take a shallow breath do not move in a way that warrants 4D-PET on most patients. Rather, many cases of misalignment between HCT and PET data may be due to the different respiration states of the patient between HCT and PET.

Mismatches of breathing patterns in combined PET/CT (SPECT/CT) examinations are a source of potential artifacts in emission images of PET and SPECT after CT-based attenuation correction. This major source of error comes from the mismatch of temporal resolution between the emission data and the CT data when the region of interest ("ROI") is in the lower thorax and abdomen. Emission data are normally acquired for several minutes during which the patient is in a light and free breathing. The CT data are normally acquired in seconds due to the high-speed acquisition nature of the CT scanner. The end results are emission images of low spatial resolution (>5 mm) and low temporal resolution (averaged over many breathing cycles), and the CT images of high spatial resolution (<1 mm) and high temporal resolution (sub-seconds). Conventional CT-based attenuation correction to obtain quantitative emission images only matches the spatial resolution of both the CT and the emission data by blurring the resolution of the CT images to the resolution of the emission data and does not take into account the mismatch of temporal resolution between the CT and the emission data.

Embodiments of the present invention provide new methods, program products, and system of AC of PET and SPECT data by using average CT (ACT) data obtained from 4D-CT such as in the thorax and lower abdomen. A benefit of using ACT is to match the temporal resolution of the CT and PET data. The ACT data, for example, can be obtained from averaging a plurality, e.g., 10 to 20, of phases of the 4D-CT data sets or from averaging the images of a breathing cycle. The averaging, for example, can be a simple averaging such as summing all of the values in a data set and dividing that total sum by the number of values within the data set and can occur before or after image reconstruction. Tumor quantification can then be evaluated in PET using HCT and ACT. For example, such quantification was performed by Applicants on 13 tumors in the thorax from 8 patients (1 patient with esophageal cancer and 7 patients with lung cancer).

Embodiments of the present invention also provide a method and program product (or software) to improve the imaging accuracy of PET/CT and SPECT/CT. The approach can be much easier to implement than other alternatives because it does not require an array of hardware, gating interface, hard tabletop, and respiratory monitoring device. Embodiments of the present invention have a potential to change the way that PET/CT and SPECT/CT will be used in the future.

Embodiments of the present invention, for example, can use the average CT of averaging of a plurality, e.g., 10 to 20, of respiratory phases of 4D-CT images (e.g., which can be acquired in either cine or helical acquisition mode) for attenuation correction of emission data influenced by the respiratory motion. By averaging the 10 to 20 respiratory phases of 4D-CT, the temporal resolution of the average CT becomes approximately one breathing cycle, and will be close to the temporal resolution of the emission data, whose temporal resolution is an average of multiple breathing cycles. This approach, for example, averages the respiratory motion in CT to match the average motion imaged in the emission data, and thus improves the tumor quantification and localization in the emission data. The averaging can also occur before image reconstruction. In this situation, the data at the same X-ray projection angle over a breathing cycle can be averaged.

Furthermore, for attenuation correction in the heart region, for example, embodiments of the present invention can use the average CT also from averaging a plurality, e.g., 5 to 10, of phases of 4D-CT images per cardiac cycle over the duration of a plurality, e.g., 3 to 10, of cardiac cycles of a breathing cycle for CT-based attenuation correction of emission data. This approach, for example, can average both cardiac and respiratory motion in the CT to match the average cardiac and respiratory motion in the emission data.

Embodiments of the present invention also can include an attenuation correction method for PET/CT and SPECT/CT utilizing the average CT images from averaging the multiple phases of 4D-CT images. Conventional attenuation correction methods only match the spatial resolution of CT and the spatial resolution of PET and SPECT data. Embodiments of a method of the present invention can use the average CT images from averaging multiple phases of CT images from 4D-CT imaging to thereby correct the attenuation of the emission data of PET and SPECT on PET/CT and SPECT/CT, respectively. The temporal resolution of CT and the temporal resolution of PET and SPECT can be matched in this approach to improve the tumor quantification and tumor localization.

Embodiments of the present invention can obtain the average CT of averaging consecutive low-dose CT images of about 1 breathing cycle (e.g., which can be acquired in either cine or helical acquisition mode) for attenuation correction of emission data influenced by the respiratory motion. The temporal resolution of each CT image should be in sub-second, and the interval between two image reconstructions should be less than the duration of data acquisition for a CT image reconstruction. By averaging the consecutive low-dose CT images over a breathing cycle, the temporal resolution of the average CT becomes approximately one breathing cycle, and the result will be close to the temporal resolution of the emission data, whose temporal resolution is an average of multiple breathing cycles. These embodiments, for example, can average the respiratory motion in CT to match the average motion in the emission data, and thus improve the tumor quantification and localization in the emission data.

In contrast to embodiments which may use either a cine or helical 4D-CT to obtain the average CT, which generally requires an array of hardware, gating interface and respiratory monitoring device, these alternative embodiments do not require these additional system elements in order to obtain the desired results. Moreover, the dose incurred in some alternatives can be normally higher than the dose in a routine diagnostic CT procedure and should not be a problem if the patient is undergoing a radiation therapy treatment. Embodiments of the present invention also include a practical method of obtaining the average CT with the same scanning protocols described in the cine or helical 4D-CT, with a much reduced radiation dose, and without any hardware, gating interface and respiratory device. The applicability of some of these alternative embodiments of the present invention to a clinical environment therefore can be greatly expanded.

Embodiments of the present invention require less radiation dose and can be less expensive in implementation since there is no need to acquire the array of hardware, gating interface, and respiratory monitoring device. The requirement for sorting the CT images in the cine or helical 4D-CT is no longer needed. The images before averaging may be noisy, however, the resulting average CT data will not be noisy because all the data scanned at the same location can contribute to the averaging. The radiation dose can be significantly reduced with a CT scan of very low milliamperes (mA) or power. The effect of averaging low-dose and noisy images can improve the statistics of the average CT images.

For example, if one CT image for attenuation correction needs 300 mA and 0.5 seconds rotation with the helical scanning of pitch=1, or with the step-and-shoot scanning, the mA value can be adjusted in the scanning technique to 30 mA for 5 second duration in the cine acquisition to obtain a similar signal-to-noise (S/N) ratio or to have a helical acquisition acquiring at each location the data of 5 second also at 30 mA. The radiation dose can stay at 150 mA with minimum radiation risk to the patient. In this way, embodiments of the present invention gain the benefit of low dose scanning, a general requirement for diagnostic imaging. By not producing the multiple-phase images of 4D-CT, the usage of a respiratory device to record the respiratory signal for 4D-CT can be avoided.

Embodiments of the present invention can achieve the benefit of using the average CT for the attenuation correction of the emission data on currently known PET/CT and SPECT/CT scanners with some program product or software upgrade and without any hardware, gating interface, of respiratory monitoring device. The respiratory duration, for example, is normally between 4 to 6 seconds and can be easily obtained by observing the breathing pattern of the patient when setting up the scan duration for the cine acquisition or the pitch value for the helical acquisition. The patient can also be imaged with a more comfortable tabletop than what perhaps some believe to be a hard and stiff therapy tabletop. In reference to the current scanning protocol, a helical CT is normally performed to cover a large area of anatomy to generate the attenuation map for the attenuation correction of emission data.

The average CT, for example, can be implemented right after the helical CT and before the emission scan so that attenuation correction can be performed right after the emission data becomes available. The average CT can be prescribed in the area where the diagnosis or staging may be compromised by the respiratory and cardiac motion and can be fused with the larger data sets of the previous helical CT through a proper slice thickness interpolation or adjustment for the whole body emission study, if needed.

Embodiments of the present invention, for example, use a practical method of achieving accurate attenuation correction for PET/CT and SPECT/CT utilizing the average CT images from either cine or helical scanning. The average CT can be obtained from averaging multiple consecutive low-dose CT images of approximately one breathing cycle. Conventional attenuation correction methods only match the spatial resolution of the CT and the spatial resolution of PET and SPECT data. The average CT images can be used for the attenuation-correction of the emission data of PET and SPECT on PET/CT and SPECT/CT, respectively. The temporal resolution of the CT and the temporal resolution of PET and SPECT can be matched in this approach to enhance the tumor quantification and tumor localization.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIGS. 5A, 5B, 5C, and 5D are graphs of respiratory waveforms in cm and seconds having an X-ray on high or low according to embodiments of the present invention;

FIG. 6 is a table comparing a cine 4D-CT and helical 4D-CT on 4 different GE LightSpeed MSCI scanners according to embodiments of the present invention;

FIG. 11 is a table (Table 1) illustrating quantification results of the same PET data by HCT and ACT according to embodiments of the present invention;

FIGS. 13A, 13B, 13C, and 13D are image data corrections according to embodiments of the present invention;

DETAILED DESCRIPTION OF THE INVENTION

Figure 1:
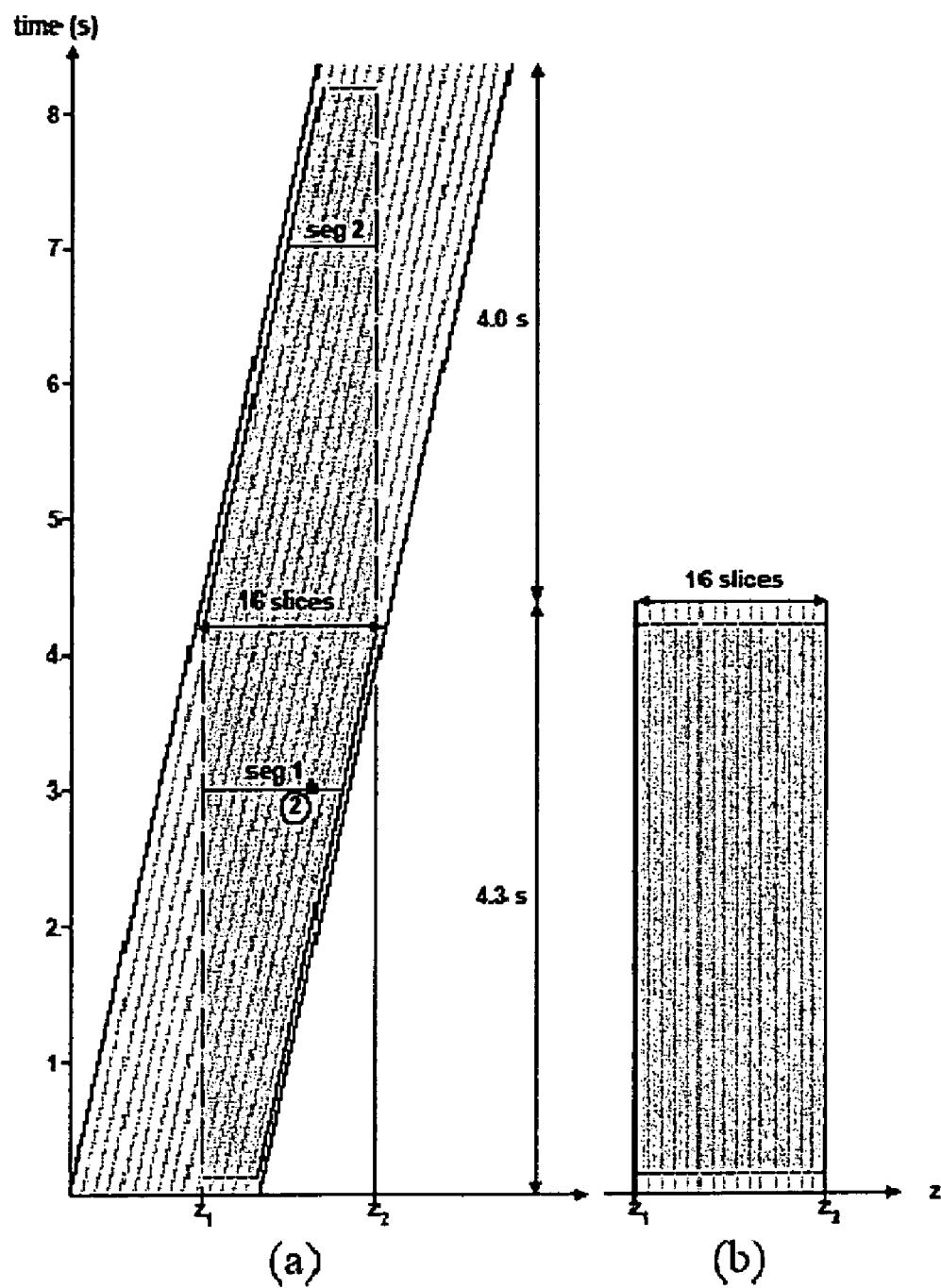
FIGS. 1A and 1B are graphs of the scanning trajectories of helical and cine 4D-CT's for a breathing cycle of 4 seconds according to embodiments of the present invention.

The present invention now will be described more fully hereinafter with reference to the accompanying drawings in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In embodiments of the present invention, for example, in radiation treatment planning, it is important to understand lesion motion relative to respiration. On a single-slice CT (SSCT) scanner, attempts have been made with prospective gating to obtain the images of a single phase and with retrospective gating for 4D-CT images. Prospective gating refers to the data acquisition triggered by the events in the respiratory signal such as the transition point of inspiration to expiration, end-inspiration, or end-expiration. Retrospective gating refers to the data acquisition of all phases of respiration and the correlation or registration of CT images with a respiratory signal conducted after the data acquisition. The purpose of 4D-CT imaging is to obtain a sequence of three-dimensional (3D) volume with respect to time for the interrogation of lesion motion caused by respiration. For a coverage of 20 cm, the SSCT scanner takes about 7 minutes for the acquisition of a single phase, and about 3.3 minutes for 4D-CT, with a possibility of missing data between slices. The reason for missing data, for example, can be that the helical pitch of SSCT was large and did not meet the data sufficiency condition (DSC) of 4D-CT. The DSC states that at each table location data have to be acquired for the duration of one breathing cycle plus the duration of data acquisition for an image reconstruction. The DSC, for example, can be described herein.

The use of a multi-slice CT (MSCT) scanner to shorten acquisition time and prevent an image gap or missing data for 4D-CT has been introduced. Currently, as understood by those skilled in the art, one 4D-CT system is commercially available that uses a cine scanning protocol with retrospective gating to achieve 4D-CT imaging in about 2 minutes with a 4-slice scanner and 1 minute with an 8- or 16-slice MSCT scanner. The clinical application of using the new 4D-CT system has also been reported.

In the cine-mode 4D-CT, the data at each table location are acquired for the duration of one breathing cycle plus 1 second to ensure a complete sampling of data for one breathing cycle. The duration of 1 second can be reduced to the duration of data needed for an image reconstruction according to the DSC. A respiratory signal synchronized with CT data acquisition is recorded with the Real-Time Position Management (RPM) Respiratory Gating System (Varian Medical Systems, Palo Alto, Calif.). The images are reconstructed at a time interval chosen to generate about 15 samples per slice location per breathing cycle. This will result in 60 and 120 images for 4- and 8-slice MSCT scanners, respectively. In total, there are about 1200 images for 20-cm coverage and 5 seconds of cine acquisition time. The images along with the respiratory signal are sent to computer program software such as the Advantage 4D-CT software on the Advantage Workstation (General Electric Company, Waukesha, Wis.) for registration to obtain a set of 4D-CT images with respect to respiratory motion.

There are differences between the design of 4D-CT imaging with the cine and helical data acquisition modes. The details of cine 4D-CT imaging are understood by those skilled in the art. The design of the cine 4D-CT, generally allows all LightSpeed MSCT scanners the capability of 4D-CT with the addition of an interface card to the LightSpeed MSCT scanner. Helical 4D-CT imaging is not available commercially on the GE MSCT scanners. The helical 4D-CT imaging on a 16-slice MSCT, however, is also understood by those skilled in the art.

The DSC for 4D-CT imaging is described herein, and a comparison of acquisition time, slice thickness or slice sensitivity profile (SSP), effective dose, ability to cope with an irregular breathing cycle, and retrospective or prospective gating of both the helical and cine 4D-CT imaging are made. Without loss of generality, the two approaches are compared on the GE LightSpeed 4-, 8-, and 16-slice MSCT scanners. Also included is the 4-slice LightSpeed RT MSCT scanner, which has a bore size of 80 cm. The other LightSpeed MSCT scanners have a 70-cm bore. The fastest gantry rotation cycle of 1 second is used for the LightSpeed RT and 0.5 seconds for the other LightSpeed MSCT scanners. The transition time between two table positions in a cine acquisition is estimated to be 1.3 seconds by a measurement on our 8-slice LightSpeed scanner in the GE Discovery ST PET/CT system. The slice configuration is 16 slices of 1.25 mm (16×1.25 mm) for the 16-slice scanner and the 4×2.5 mm and 8×2.5 mm for the 4- and 8-slice scanners, respectively, to fully utilize the detector coverage. As understood by those skilled in the art, methods can be applied to the scanners of other vendors as well.

To achieve 4D-CT imaging of an object with respiratory motion, an acquisition has to collect data at each location for the duration of a breathing cycle (Tb) plus the duration of data acquisition for an image reconstruction, equal to one gantry rotation cycle (Tg) if using the full-scan reconstruction, or two-thirds (⅔) gantry rotation cycle if using the half-scan reconstruction. This can be called a data sufficiency condition or DSC for the 4D-CT imaging. The reason for adding the duration of data acquisition for one image reconstruction is to ensure that there are images covering a complete breathing cycle.

For example, there can be two acquisition modes of data collection to realize 4D-CT imaging: helical and cine. A helical scan acquires data when the table translates at a constant speed, programmed by a pitch factor p, which is the ratio between the distance the imaging table translates in one gantry rotation and the width of the X-ray collimation on the detector. To satisfy the DSC, $$p \leq \frac{T_g}{T_b + T_g}$$

for the full-scan reconstruction, and $$p \leq \frac{T_g}{T_b + 2/3 T_g}$$

for the half-scan reconstruction. The values of p become 0.115, 0.094 and 0.079 for the breathing cycles of 4, 5, and 6 seconds, respectively, with the half-scan reconstruction and 0.5 second gantry rotation cycle. The longer the breathing cycle Tb is, the smaller the pitch factor p is, and the longer the acquisition time becomes. It is noted that p is normally between 0.75 and 1.5 for a diagnostic CT imaging procedure with breath hold. The scan speed of the helical 4D-CT has to be significantly reduced by 6 to 20 times.

A cine scan acquires data continuously at the same position for a duration of Tb+Tg for the full-scan reconstruction or Tb+⅔ Tg for the half-scan reconstruction. Multiple cine scans are required to cover a prescribed scan area. During reconstruction, the helical scan data allow reconstructions at any position in the volume of data acquisition, and the cine scan data allow reconstructions only at the positions of data acquisition. When the DSC is satisfied, both the helical and cine scans provide complete coverage without any gap between slices in the imaged volume. This property is not obvious in SSCT 4D-CT imaging. To satisfy the DSC on a SSCT, the table has to travel the distance of a slice thickness for the duration of a breathing cycle plus the duration of data acquisition for an image reconstruction.

FIGS. 1A and B show the acquisition trajectories for the helical and cine 4D-CT's, respectively. Assume that the breathing cycle is 4 seconds, the fan angle of the CT detector is 60°, the gantry rotation cycle is 0.5 seconds, and a 16-slice MSCT is used. The cine acquisition will scan for 4.3 seconds and the helical acquisition for 8.3 seconds to cover 2 cm or 16 slices of 1.25 mm. The longer acquisition time needed by the helical 4D (p=0.115) over the cine 4D is due to the additional time needed for the table to translate in the scan to cover all the phases of a respiratory cycle. Although both the helical and cine scans provide the 4D-CT images of the same range from z1 to z2, the helical scan needs to turn on the X-ray earlier and turn off the X-ray later than the cine scan. The shaded area indicates the region of possible image reconstructions relative to image locations where all phases of respiration are available. The area before z1 and the area after z2 do not have all the phases of respiration.

Figure 2:
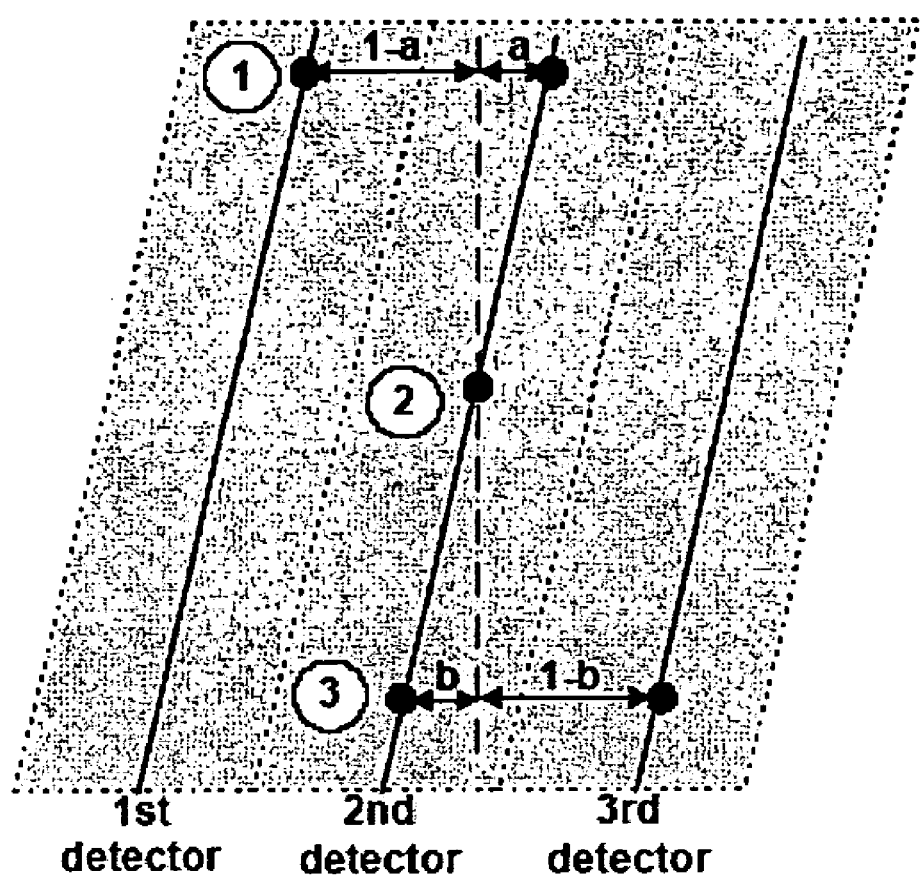
FIG. 2 is a graph illustrating an interpolation using the helical data around point 2 in "seg 1" of FIG. 1A according to embodiments of the present invention.

An interpolation using the helical data around point 2 in "seg 1" is illustrated in FIG. 2. In FIGS. 1A and B, the outermost two detector rows are shown with thick lines. Each trajectory line corresponds to the trajectory of the center of a detector. To scan only one breathing cycle of data for 4D-CT, the helical acquisition will need to scan for 8.3 seconds, and the cine acquisition needs only 4.3 seconds. In FIG. 2, each solid line shows the trajectory of the center of a detector in the helical scanning and is right in the middle of two parallel dotted lines showing the size of each detector. Data point 1 will be interpolated from the data of the 1st detector by (1−a) and the 2nd detector by a. Similarly, data point 3 is interpolated from the data of the 2nd detector by b and the 3rd detector by (1−b). Both a and b change linearly from 1 at the 2nd detector to 0 at the first and third detectors, respectively. Data point 2 does not need any interpolation because it is right on the 2nd detector.

Each image will be time-stamped with the average acquisition time or mid-scan time, which will be used to register the images with the respiratory signal. Note that the shaded area does not start from time 0 or end at time 4.3 seconds for the cine acquisition and 8.3 seconds for the helical acquisition. This is because each image requires 240° (i.e., 180° plus 60° fan angle) of data for an image reconstruction. Unlike the cine images which are reconstructed using the data in a single respiratory cycle, the helical images can be obtained from one or two breathing cycles. The images at 3 and 7 seconds correspond to the images at the same phase over two breathing cycles of 4-second duration. For clarity, the images in "seg 1" use the data from 2.835 seconds to 3.165 seconds and their mid-scan times are 3 seconds. The time span of the data is 0.33 seconds for the half-scan reconstruction. Similarly, the images in "seg 2" use the data from 6.835 seconds to 7.165 seconds, and their mid-scan times are 7 seconds. The images in "seg 1" overlap in Z location with the images in "seg 2". Either one of the two images at the same Z location in "seg 1" and "seg 2" can be chosen, or an average of the two images can be taken to produce a single image at the Z location.

For example, acquisition time can be defined as the duration from the first X-ray on to the last X-ray off for the coverage of 20 cm. A helical acquisition needs an additional breathing cycle of data to satisfy the DSC, as illustrated in FIGS. 1-2, and a cine acquisition needs an additional time of table translation between two cine steps over which the X-ray is turned off. In general, the helical acquisition can be faster than the cine acquisition for a large coverage because the table translates continuously without any stop in the helical acquisition. When the volume of acquisition becomes smaller, the cine acquisition can become more efficient because the helical acquisition needs an additional breathing cycle of scanning, as shown in FIGS. 1-2.

Figure 3A:
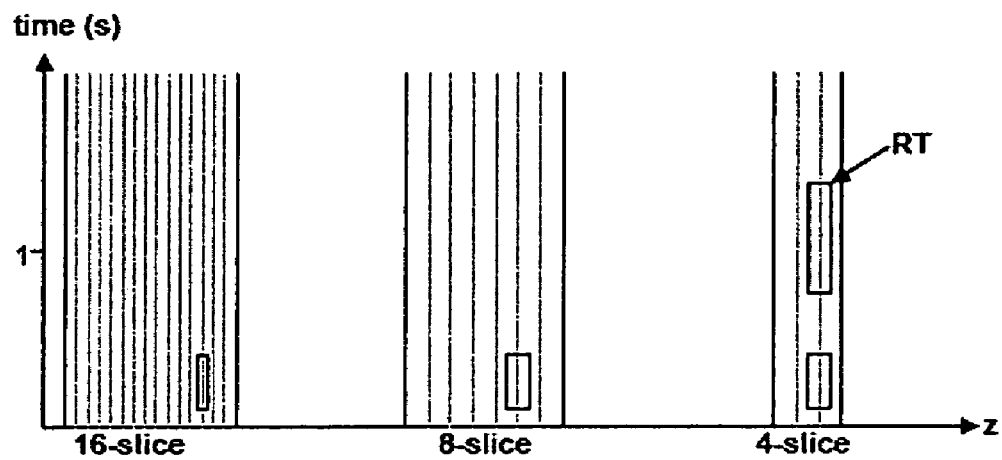
FIGS. 3A and 3B are graphs illustrating the trajectories of the cine and helical 4D-CT's on the LightSpeed 16-, 8- and 4-slice CT systems according to embodiments of the present invention.
Figure 3:
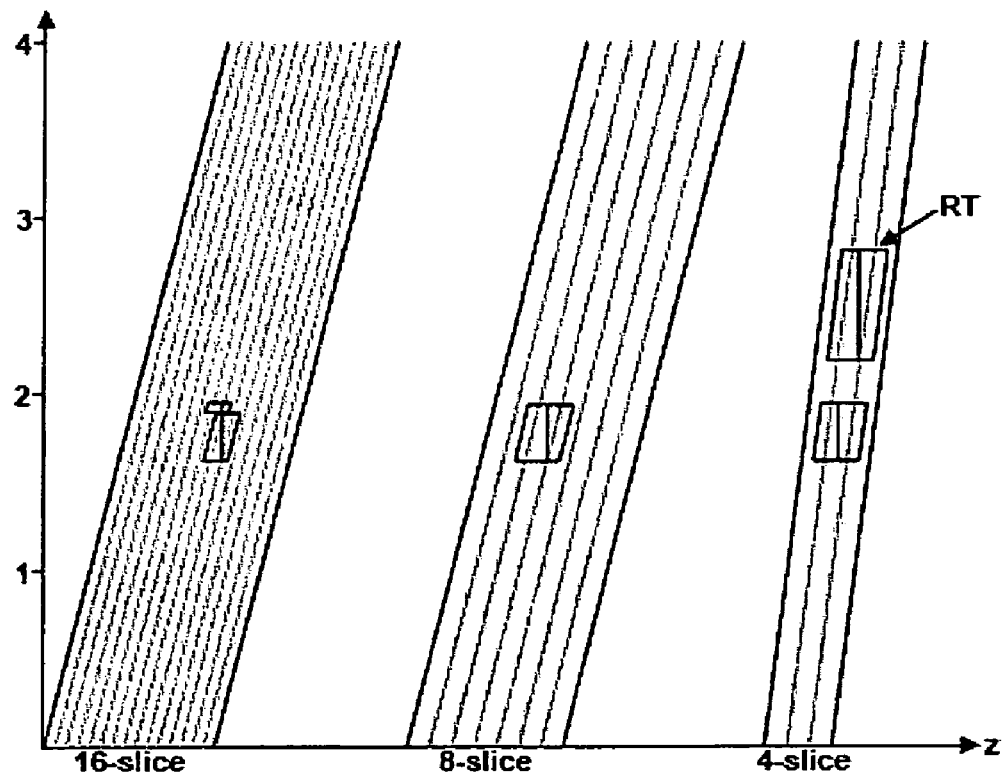

Helical scan data allow image reconstruction at any location because the reconstruction normally incorporates an interpolation scheme between the data of two adjacent detector rows, which will increase the slice thickness of the reconstructed image. FIG. 3 shows the scanning trajectories of both the cine and helical scannings for 4-, 8- and 16-slice CT systems, e.g., Lightspeed. Several areas indicate the range of data used in the reconstruction. It is assumed that the breathing cycle is 4 seconds, and 240° of data are used in the half-scan reconstruction. There are two areas in the 4-slice trajectories. The reconstruction for 0.5 seconds on the 4-slice system uses only 0.33 seconds of data, and the reconstruction for 1.0 seconds on the 4-slice RT system uses 0.67 seconds, marked by RT. It is clear that the range of data in Z for a helical scan is larger than the corresponding one in a cine scan.

Because the half-scan reconstruction is used, the total time (vertical span) of data for reconstruction is 0.33 seconds for all the LightSpeed MSCT scanners but 0.67 seconds for the LightSpeed RT because of its slower gantry rotation cycle of 1 second. It is straightforward in the cine image reconstruction that the data are close to the slice or detector location. The data in Z extends from a half of the slice thickness to the left to a half of the slice thickness to the right. For this reason, we have a rectangular area intercepting a detector in the half-scan reconstruction for the cine acquisition. The position of each rectangle is only for illustrating data utilization in the reconstruction. It can be at any of the detector rows, at a different time, or both.

For the helical 4D-CT, we start from a Z location and draw a vertical line segment to indicate the range of data in time (Y-axis) used in the reconstruction. In the 16-slice example, two parallelograms are needed to cover 0.33 seconds. In the other cases, there is only one parallelogram for either the 4- or 8-slice system. Each area indicates the range of data in Z for an image reconstruction. The two parallelograms in the 16-slice helical indicates that at the selected location, the data for image reconstruction come in part from the two detectors intercepted by the top parallelogram and in part from the two detectors intercepted by the bottom parallelogram. A location at which there is only one parallelogram in the helical 16-slice 4D-CT may be found as well. It is clear that the slice thickness broadens significantly in the low pitch helical 4D-CT scan.

Figure 4A:
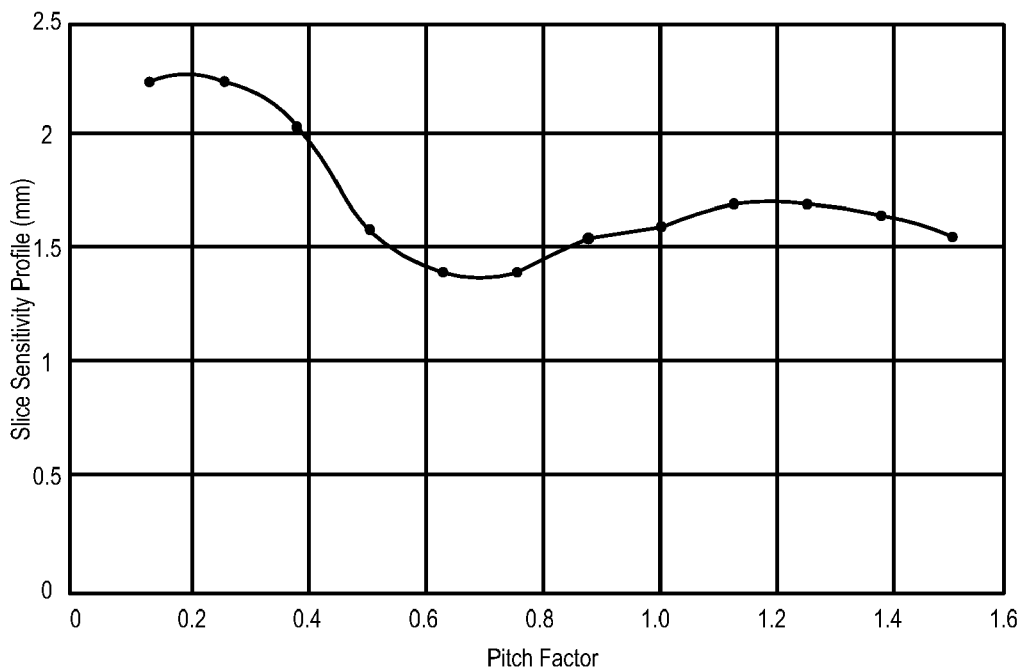
FIGS. 4A and 4B are graphs illustrating slice sensitivity profile (mm) vs. pitch factor according to embodiments of the present invention.
Figure 4B:
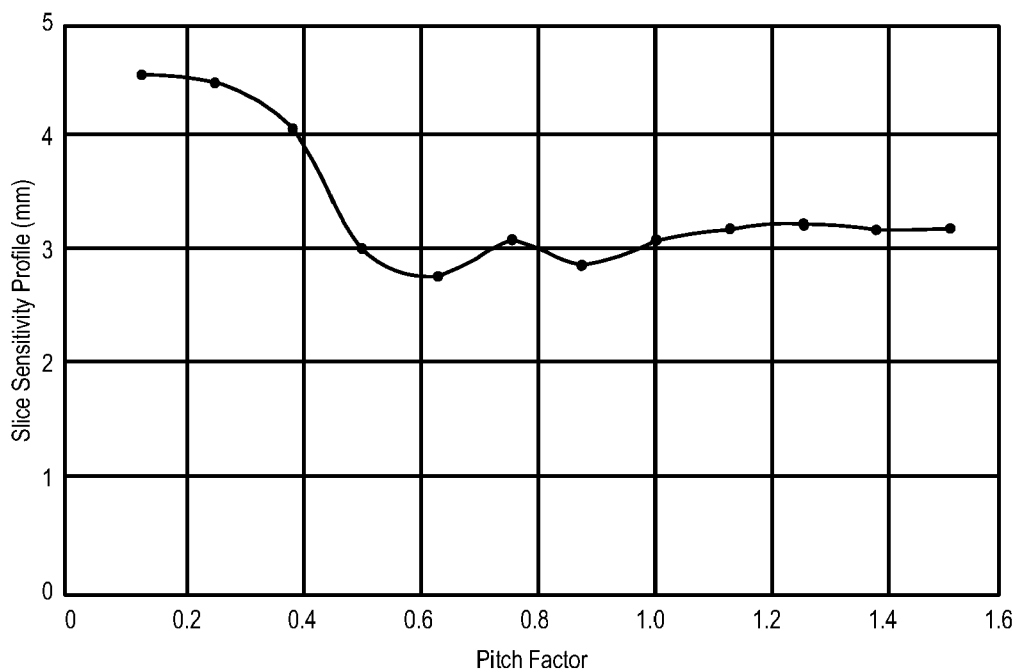

FIGS. 4A and 4B show the measured SSP for a 4-slice LightSpeed MSCT scanner. The measured SSP's of (a) 1.25 mm and (b) 2.5 mm collimations from a 4-slice system. The SSP of p=0.115 for a 16-slice system can be obtained from p=0.23 in (a). Similarly, the SSP of p=0.115 for an 8-slice system can be obtained from p=0.23 in (b). The measurement in full-width half-maximum was made by the images reconstructed along the center of the detector in Z. The measurement was taken on a thin aluminum disk of 2 cm in diameter parallel to the imaging plane and 0.2 mm thick. The pitch factors selected for helical scanning ranged from 0.125 to 1.5 in increments of 0.125. The reconstruction was made with the half-scan reconstruction along the center of the detector in the helical trajectory, and the interval between two consecutive images was 0.1 mm.

A region of interest ("ROI") was placed over the region of the thin aluminum disk in each image. Summations of CT number over the ROI's of all images were calculated, and full-width of half-maximum (FWHM) values were obtained. FIGS. 4A and B show that the SSP widens in the lower pitch scan to meet the DSC for the helical 4D-CT imaging. For the pitch factor of 0.115 on an 8-slice system, we can derive the SSP from the pitch factor of 0.23 of the 4-slice measurement in FIGS. 4A and B because the 8-slice MSCT will scan twice as fast as the 4-slice MSCT. This, however, will not be true for the 16-slice MSCT, because the slice collimation becomes 16×1.25 mm, which has the same coverage and speed as 8×2.5 mm. This phenomenon can be observed in FIGS. 4A and B, in which the helical 16-slice has the same pitch factor (slope) as the 8-slice. If the slice collimations are 4×2.5, 8×2.5, and 16×1.25 mm, then the slice thicknesses will become 4.5, 4.5, and 2.3 mm, which are 1.8 times the slice collimations of 2.5, 2.5, and 1.25 mm, respectively. In the image reconstruction of the cine data, there is no data interpolation between detector rows. The same slice thickness as the X-ray collimation can be maintained in the image reconstruction of the cine data. For example, we can obtain 4 slices of 2.5 mm images with 4×2.5 mm collimation and 8 slices of 2.5 mm images with 8×2.5 mm collimation.

The relationship between SSP and pitch factor in an SSCT is relatively straightforward. The higher the pitch factor is, the broader the SSP becomes. Because the trajectory of the detector is a single helix, the data at different view angles correspond to different Z locations. The spread of the data in Z is proportional to pitch factor (p) and SSP.

This concept may not directly translate into the discussion of SSP in MSCT as it has been reported that preferred pitches exist in MSCT. This is because opposing (or conjugate) projections in MSCT can supplement data points between two detectors in the Z direction when the imaged object is stationary. In applications such as coronary artery imaging and 4D-CT imaging, when the imaged object is moving and the temporal resolution 2 is important, however, the opposing projections to increase the Z sampling for improving SSP because they are acquired at two different time points or phases.

The higher p in the helical MSCT does not cause SSP broadening because the reconstruction is able to use data close to the real measurement from the projection data and the interpolation between two detector rows does not cause a significant broadening of SSP. When p becomes small as in the helical multi-slice 4D-CT, there is less utilization of data directly from the measurement. In this case, the interpolation of the data points will broaden the SSP. FIG. 2 shows an example of this broadening. The three data points 1, 2, and 3 on the dashed line have the same Z location. Each solid line shows the trajectory of the center of the detector in the helical scanning, is right in the middle of two parallel dotted lines showing the size of each detector, and is identical to the detector collimation. For example, the size is 2.5 mm if detector collimation is 4×2.5 or 8×2.5 mm. Data point 1 will come from interpolation of the data on the 1st and 2nd detectors and be weighted by (1−a) and a, respectively, where a is 0.5 if the Z location (dashed line) is right in the middle of the 1st and 2nd detectors, a becomes 1 if the Z location is right on the 2nd detector, and a linearly decreases to 0 when the Z location changes from the 2nd detector to the 1st detector. The same reasoning applies to data point 3. In this case, the data of the 2nd and 3rd detectors are interpolated to make data point 3, and b decreases linearly from 1 to 0 when Z changes from the 2nd detector to the 3rd detector. Data point 2 needs no interpolation because it is right on the 2nd detector. If the data for reconstruction contain the data points 1, 2, and 3, then the data range from the left edge of the 1st detector to the right edge of the 3rd detector. Therefore, SSP broadens in the low pitch helical 4D-CT. Similar helical reconstructions with interpolation were reported in.

In CT, temporal resolution is normally quoted as half of the gantry rotation cycle. Temporal window normally refers to the duration of data used in the image reconstruction. Using half-scan reconstruction and 0.5-second gantry rotation, the temporal resolution is 0.25 seconds, which is the FWHM of the temporal window 0.33 seconds, obtained from ¾ of 0.5 seconds. It will be understood by those skilled in the art, however, that a temporal resolution of less than 0.5 seconds can be advantageous and in many instances this is only limited by the speed of the machine available. For example, it is understood that some machines will have a temporal resolution of 0.33 seconds.

Dose efficiency can be defined as the duration of the X-ray used in the image reconstruction to the total X-ray on time in the data acquisition. The dose efficiency for the cine 4D-CT is 100%, i.e., all the data collected can be used to generate images. The dose efficiency for the helical 4D-CT is $$(Tt-Tb)/Tt \times 100\%$$

where Tt is the total acquisition time in a helical scan. The dose efficiency for the helical 4D-CT is always less than 100% because of the additional breathing cycle needed in the helical 4D-CT. When there are irregular breathing cycles in the scan and a shorter repeat scan is needed, the helical 4D-CT will become less dose efficient. The worst case, for example, is 50%, as perhaps illustrated in FIGS. 1A and B. This is more applicable to the patient coughing for a limited time, and not to the situation in which several cycles of irregular breathing occur.

A prospective 4D-CT scan, which can be helical or cine, is one for which image data are reconstructed according to real-time events in a respiratory signal. One commonly used event is the end-inspiration phase, which is relatively easy for detection in real time. After obtaining the real-time events, the CT image reconstructions for prospective 4D-CT can be initiated according to the selected events. The results are the images reconstructed according to the preselected phases. A similar reconstruction scheme has been used in the cardiac CT using the R-peaks of electrocardiogram waveform as the real-time events in the helical 4D-CT.

It is advantageous to synchronize reconstructions with the respiratory signal and avoid the registration step after reconstruction. At present time, however, the detection of the real-time events in the respiratory signal is not ideal in the Varian RPM system, which can record and assign respiratory phases and send out triggers to a CT scanner or a radiation therapy machine on the basis of a preset phase or an amplitude value in real time. FIGS. 5A-D show two examples of the first 30 seconds of RPM in two 4D-CT patient studies. FIGS. 5A and 5C are two respiratory waveforms collected from the Varian RPM. The dotted dashed lines are the end-inspiration phases detected in real-time by the RPM device. The accurate identifications of the respiratory waveforms in FIGS. 5A and 5C are shown in FIGS. 5B and 5D, respectively. The square waveform in the bottom of each figure indicates the X-ray on (high) and the X-ray off (low) in the cine 4D-CT imaging.

The two RPM recordings did not have the sinusoidal patterns that can be processed more accurately by the RPM. The dotted dash lines in both FIGS. 5A and 5C are selections from the real-time trigger events of the end-inspiration phase by the RPM and cannot be exported successfully by the re-processing tool of the RPM for 4D-CT imaging. We have designed a re-processing tool in MATLAB to remedy these shortcomings. The correct identifications for FIGS. 5A and 5C are shown in FIGS. 5B and 5D, respectively. Comparing FIGS. 5A and 5B, we notice the lack of trigger events in the 2nd and 3rd respiratory cycles, delayed triggers in the 4th and 5th cycles, triggers of almost a half-cycle off in the 6th, 9th, and 10th cycles, and a double-trigger in the last cycle. Comparing FIGS. 5C and 5D, there are double triggers in all cycles from the RPM in FIG. 5C. Other respiratory recording devices may also have issues similar to those of the RPM if they are used in the real-time mode.

In addition to the inaccuracy in determining the real-time trigger events, there is also an inherent temporal window limitation in CT image reconstruction. A CT image has some finite temporal window of 0.33 seconds with half-scan reconstruction and a 0.5 second gantry rotation cycle. The 0.33 seconds is 8% of a 4-second, 6.7% of a 5-second, and 5.5% of a 6 second breathing cycle. Therefore, there is some degree of uncertainty inherent in CT image reconstruction, and it may not be meaningful to compare two 4D-CT's with less than 5% phase difference between two 4D-CT's.

One implementation of retrospective gating has the characteristics of data collection synchronized with the recording of a respiratory signal, and the reconstruction is conducted with the time interval between images set to be small to produce about 15 image reconstructions per breathing cycle per slice location. One advantage of this approach is that it allows a user to examine the respiratory signal and to favor some image selection other than the default selection by the nearest neighbor criterion, which selects images with phases closest to the target phase. One disadvantage in this approach is that there is some phase error between the phase of the image and the desired phase in the image selection. The phase error can be minimized with about 15 image reconstructions per breathing cycle per slice location, and the phase error can stay within ±3.3% (=(100%/15)/2).

It is important to recognize that the identification algorithm used by a respiratory monitoring device may be more important than the difference between the prospective and retrospective reconstruction modes. When the identification of respiratory phases improves in accuracy, it is believed that prospective gating will be able to produce the images at the desired phases more accurately. It is prudent to have the retrospective registration in the cine 4D-CT or to have a prospective reconstruction in the helical 4D-CT followed by a re-examination of the respiratory signal and a 2nd CT image reconstruction if there are inaccurate triggers from a respiratory monitoring device.

An ideal 4D-CT imaging should have correct phases identified before the image reconstruction. In this case, the 4D-CT with prospective gating can be a desirable approach for 4D-CT. A method to allow the user to retrospectively override the image selection, however, can be important to prevent any phase or trigger from being inaccurately identified by a respiratory monitoring device.

Some irregular breathing cycles caused by patient discomfort or involuntary coughing are not uncommon, even though the scan time of 4D-CT imaging is about 1-2 min. A good quality 4D-CT imaging should address the effects of breathing irregularity. In the cine 4D-CT, it is relatively easy to identify the positions of scanning at which an instance of irregular breathing occurs. It is feasible to go back to the same location for one more cine scan of the duration of one breathing cycle plus 1 second. The data of the new scan can replace the data of the old scan affected by the irregular breathing. It is not very straightforward, however, to do another helical scan of only one location if some images are reconstructed by averaging the data from two breathing cycles. There is also the disadvantage that the helical 4D-CT irradiates the patient for two breathing cycles if a short scan is to be repeated for the data of one breathing cycle. If a significant portion of the scan is compromised by a prolonged breathing irregularity, then a potential repeat scan may be warranted or the patient may just not be able to maintain regular normal breathing in 4D-CT.

FIG. 6 is a table that compares the cine 4D-CT and helical 4D-CT on 4 different LightSpeed MSCT scanners. The major advantage for the helical 4D-CT is about a 10% speedup in the scanning of 20-cm coverage, and the major disadvantages are the dose efficiency (96% for 4-slice and 92% for 8- and 16-slice), and the broadening of SSP from 2.5 to 4.5 mm on the 4- and 8-slice systems and from 1.25 to 2.3 mm on the 16-slice system. The major advantages of the cine 4D-CT are that the slice thickness or SSP is equal to their slice collimation, and the dose efficiency is 100%.

A DSC for 4D-CT imaging has been described in that an acquisition has to collect data at each location for the duration of a breathing cycle plus the duration of data acquisition for an image reconstruction. The DSC is the basis for the comparison between the helical and cine 4D-CT imagings. The two techniques have been compared in acquisition time, SSP, dose efficiency, and ability to cope with an irregular breathing cycle, and prospective or retrospective gating for 20-cm coverage, 4-second breathing cycle and half-scan reconstruction on the LightSpeed RT (4-slice, 1 s), Plus (4-slice, 0.5 s), Ultra (8-slice, 0.5 s) and 16 (16-slice, 0.5 s) MSCT scanners.

A major advantage for the helical 4D-CT is about a 10% speedup in scanning, and major disadvantages are the dose efficiency (96% for 4-slice and 92% for 8- and 16-slice), and the broadening of SSP from 2.5 to 4.5 mm on the 4- and 8-slice systems and from 1.25 to 2.3 mm on the 16-slice system. Major advantages of the cine 4D-CT are the slice thickness equal to their slice collimation and 100% dose efficiency. The cine 4D-CT is better than the helical 4D-CT in coping with an irregular breathing cycle because the location of the irregular breathing cycle can be identified and the dose can be kept at a minimum for a repeat short scan. The reconstruction in the helical 4D-CT causes a significant broadening of SSP because of the data interpolation of adjacent detector rows in a very low pitch helical MSCT scan, which is significantly slower than that in most of the diagnostic helical CT scans. The broadening of SSP also prohibits the utilization of the thin slice collimation offered by the 16-slice MSCT scanner.

The current implementation of the RPM system in some cases may not have the accuracy to identify the end-inspiration phases. Therefore, it is not very clear that the current version of the RPM used in the prospective gating in the phase gating mode will be better than that used in the retrospective gating. Other respiratory recording devices may have a similar issue as well. It is believed that 4D-CT with prospective gating, however, will be desirable to shorten the reconstruction time once the accuracy of identifying the respiration phases can be improved.

To address the mismatch issue as identified and described herein, a retrospective study was conducted of 7 patients undergoing a PET/CT imaging followed by a 4D-CT imaging. There were in total 11 lesions. Embodiments of the present invention using the average CT from 4D-CT imaging can improve the detection, quantification and tumor localization of these 11 lesions.

For example, data was acquired on a PET/CT scanner (Discovery ST; General Electric Medical Systems, Waukesha, Wis.) with a 4D-CT option. The CT component of this scanner has a 50-cm transaxial field of view (FOV) and can acquire 8 slices per X-ray tube rotation. The CT slice thickness can range from 1.25 to 10 mm. The X-ray tube current can be varied between 10 and 440 mA, and the tube voltage setting can be 80, 100, 120, or 140 kVp. The table feed rate of the CT scanner ranges from 1.25 to 30 mm per 360-degree rotation of the X-ray tube. The fastest gantry rotation is 0.5 seconds, and the maximum helical scan time is 120 seconds. The in-plane spatial resolution can achieve 0.32 mm.

The PET component of the Discovery ST scanner is composed of 24 rings of BGO detectors. The dimensions of each detector element are 6.3×6.3×30 mm in the tangential, axial, and radial directions, respectively. The scanner has a transaxial FOV of 70 cm and an axial FOV of 15.7 cm. The scanner is also capable of acquiring data in two-dimensional (2D) and three-dimensional (3D) modes by retracting tungsten septa (54 mm long and 0.8 mm thick) from the FOV. The performance of this scanner is understood by those skilled in the art.

A real-time position management optical system (RPM; Varian Medical Systems, Palo Alto, Calif.) was mounted at the end of the imaging table to record the respiratory waveform of the patient for synchronization with the cine CT data collection for 4D-CT. The scan time for 20 cm coverage and 5 seconds cine duration is about 1 minute on an 8-slice CT vs. 2 minutes on a 4-slice CT. The cine 4D-CT is commercially available by General Electric.

One Hundred consecutive patient studies were examined for instances of misalignment between HCT and PET that followed a protocol used in the Department of Diagnostic Imaging at The University of Texas M.D. Anderson Cancer Center. Eight additional patients (1 with esophageal cancer and 7 with lung cancer) were also enrolled in a comparison of PET quantification with HCT and ACT. These 8 patients (4 men and 4 women) were scanned by 4D-CT after their PET/CT studies were performed. Their mean age was 67.6 year and their ages ranged from 57 to 81 years. The study was a retrospective study and was approved by the institution under protocol RCR05-0064. The patients received both scans of PET/CT and 4D-CT for staging and radiation therapy treatment planning.

All the patients were injected with 555-740 MBq of FDG and scanned for 1 hour after injection. The HCT data was obtained at settings of 120 kV, 300 mA, pitch 1.35:1, 8×1.25 mm collimation, and 0.5 seconds gantry rotation; and the patients were instructed to hold their breath at mid-expiration during HCT of the thorax. The PET data was acquired for 3 minutes per 15-cm bed.

Figure 7:
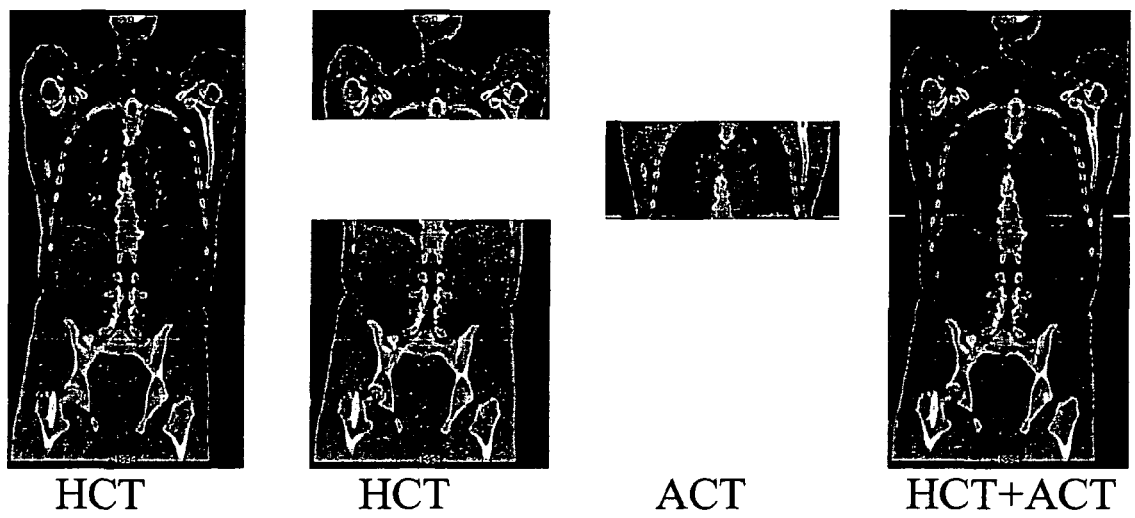
FIG. 7 is a series of schematic image data illustrating the formation of ACT data for PET attenuation correction according to embodiments of the present invention.

The ACT data was obtained by averaging (e.g., simple averaging) a plurality of phases, i.e., the 10 even phases, of 4D-CT data for the AC of the PET data. It will be understood by those skilled in the art that the number of phases can be 2 or more. The plurality of phases which can be the most advantageous can vary as understood by those skilled in the art, but in example is preferably 10 or more, or more preferably 10-20. The data from 4D-CT of the thorax were obtained at settings of 120 kV, 50-150 mA, cine duration of one breathing cycle plus 1 second, 8×2.5-mm collimation, and 0.5 seconds rotation cycle. The data from ACT of the thorax was combined with the HCT data from outside the thorax to make up the CT images for the AC of the PET data, which has an average of 6 bed positions or a total of 90 cm. For simplicity, this combined CT data referred to as the ACT data even though a significant portion of the data was from HCT. FIG. 7 shows an example of combining the ACT and HCT data. Both the ACT and HCT data was used for the AC of the same PET data. The reconstruction of the PET data was carried out with two iterations of ordered-subset expectation maximization (OSEM) with 30 subsets, 128×128 pixel matrix, and 50-cm FOV. As illustrated in FIG. 7, the HCT data are on the 1st panel (left). Part of the HCT data not overlapping with the ACT data (3rd panel) is repeated on the 2nd panel. We combined the HCT data on the 2nd panel and the ACT data on the 3rd panel to make the HCT+ACT data on the 4th panel. The main purpose of this fusion is to make the PET/CT accept the new HCT+ACT data as if the data was from HCT alone. All images are coronal. These images were from patient number five of the study (also shown in FIGS. 5A-D).

Figure 8:
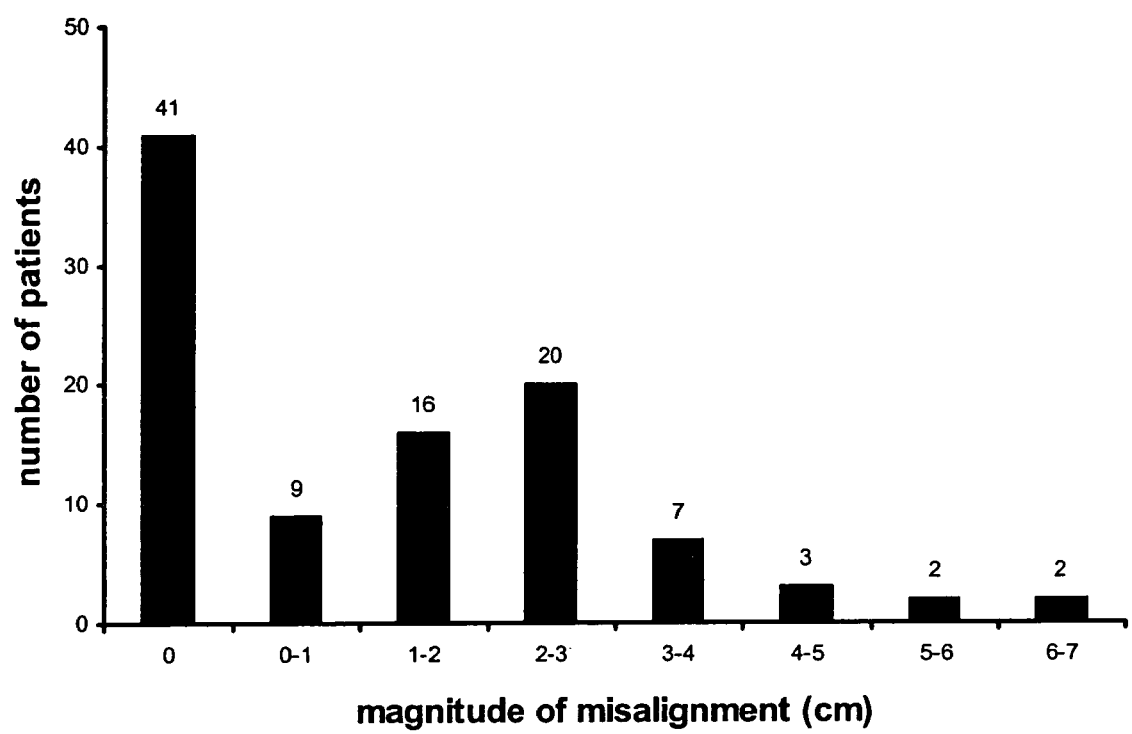
FIG. 8 is a graph of the frequency and the magnitude of misalignment between the PET and HCT scans of the lower right thorax in 100 PET/CT studies according to embodiments of the present invention.

FIG. 8 shows the alignment results at the lower right diaphragm position between HCT and PET for 100 patient studies. It illustrates the frequency and magnitude of misalignment between the PET and HCT scans of the lower right thorax in 100 PET/CT studies. There were 41 patient studies with no misalignment and 59 patient studies with a misalignment between HCT and PET, which was identified as a white band in the lower right thorax in the PET data. There were 29 patient studies with a misalignment of more than 2 cm. The largest difference was 6 to 7 cm, which may have exceeded the normal range of diaphragm motion in free breathing. This finding suggested a potential drawback of limited breath-hold during HCT.

Figure 9:
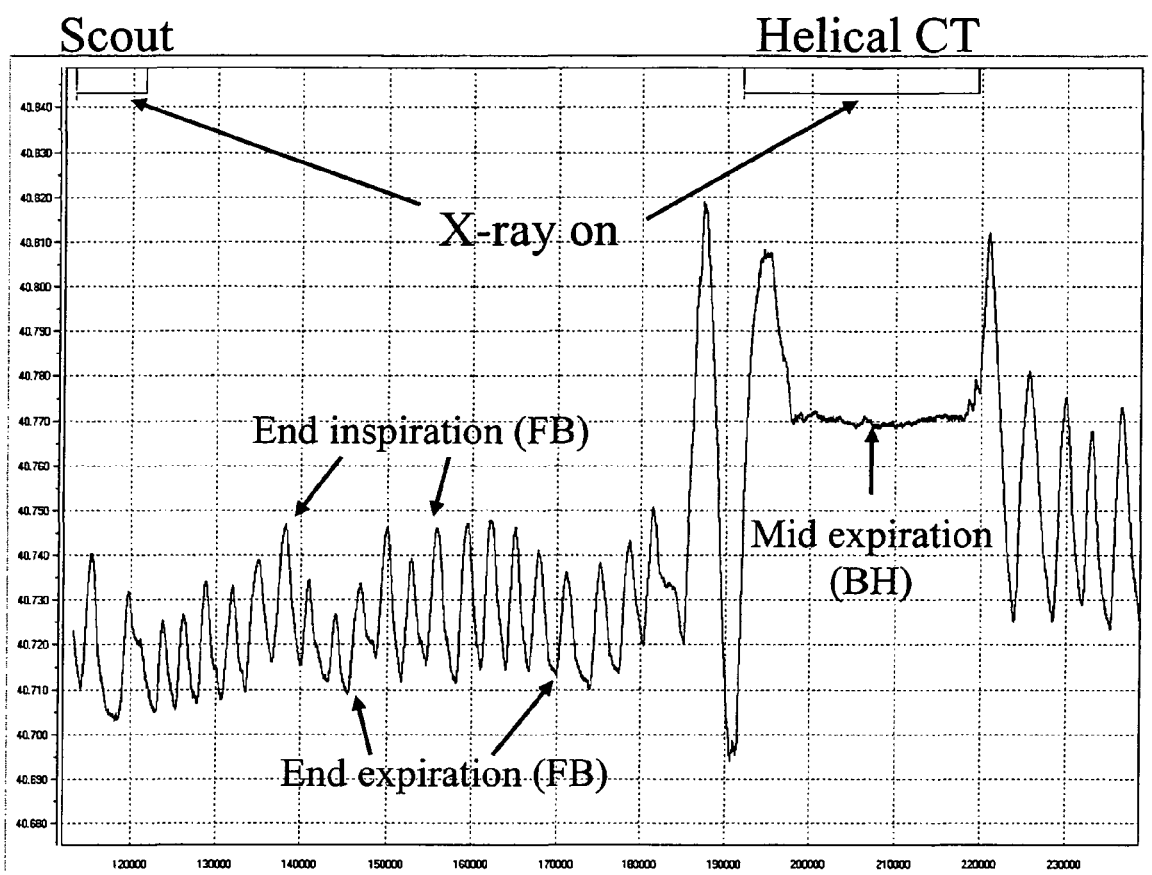
FIG. 9 is a schematic graph illustrating a respiratory signal recorded during HCT before PET according to embodiments of the present invention.

FIG. 9 shows an example of a respiratory signal recorded in one of the clinical PET/CT study. The mid-expiration state of breath-hold in the HCT data was at an even deeper inspiration than the end inspiration in free breathing. This may be the major source of misalignment when the tumor of interest is in the lower thorax. A respiratory signal recorded during HCT before PET. The recording was made by a strain gage at a sampling frequency of 1 kHz. A scout scan was taken to survey the anatomy during which the patient was breathing freely. After the scout scan, the patient was instructed to prepare for a limited breath-hold at mid-expiration for HCT. It was noted that the patient was holding a breath at a state different from any breathing state prior to the breath-hold. BH stands for breath-hold, and FB stands for breathing freely.

Figure 10:
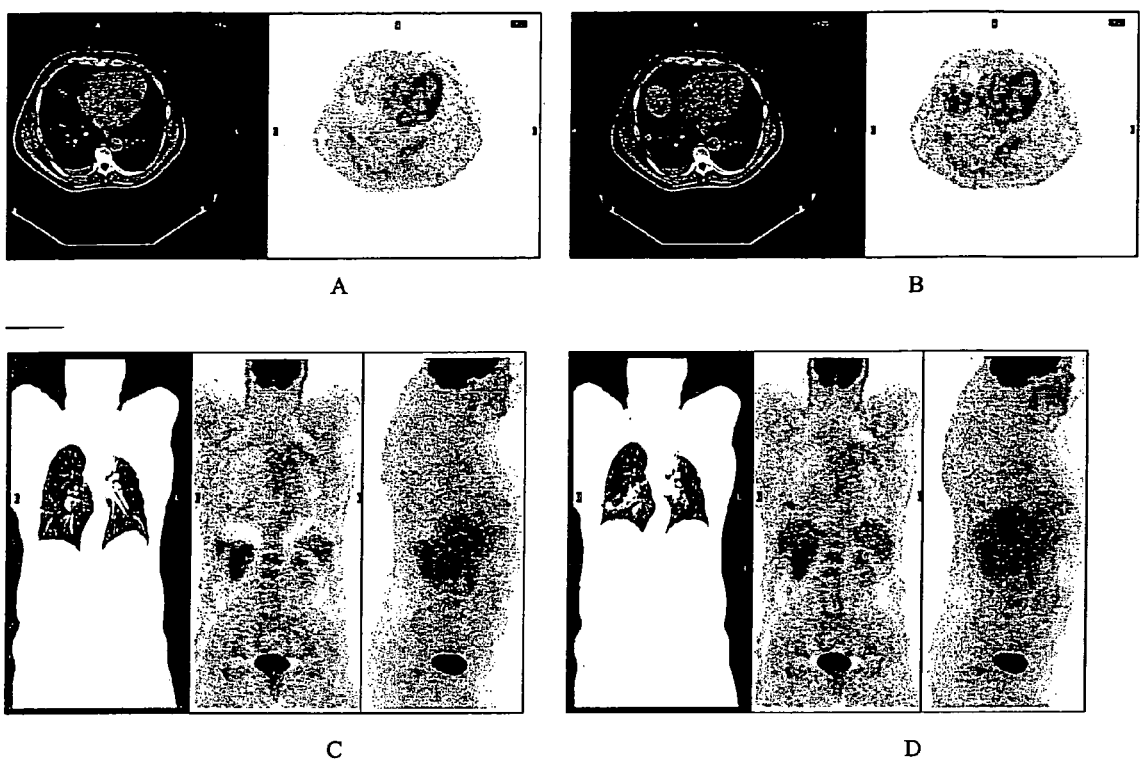
FIGS. 10A, 10B, 10C, and 10D are image data corrections according to embodiments of the present invention.

As shown in FIGS. 10A-10D, FIG. 10A illustrates the axial HCT and PET data (corrected by HCT) for tumor 1 (patient 1), and FIG. 10B illustrates the corresponding axial ACT and PET data (corrected by ACT). The SUVs of the HCT-PET and the ACT-PET were 2.3 and 3.6, respectively. There was an increase in SUV of 59.0% between the HCT-PET and the ACT-PET. FIG. 10C illustrates the coronal HCT, HCT-PET, and MIP of HCT-PET data, and FIG. 10D illustrates the coronal ACT, ACT-PET, and MIP of ACT-PET data. With the use of ACT, there was a significant reduction in breathing artifacts caused by the different breathing states during the HCT and PET, suggesting that ACT can effectively reduce breathing artifacts and improve the quantitation of PET data. On each image, there is either a cross-hair or an arrow pointing to the tumor location. The same tumor can also be seen in both the ACT and the PET data in 10B but not in 10A.

The table in FIG. 11 shows the results of the AC of the same PET data by HCT when patients held their breath at mid-expiration and by ACT when patients took a shallow breath. There were 9 tumors from 6 patients with a difference in standardized uptake value (SUV) of less than 30% and 4 tumors from 3 patients with an SUV difference of more than 50%. The tumors with more than a 50% change in SUV are shown in the shaded area of the table in FIG. 11 and came from a patient with esophageal cancer and two of the patients with lung cancer. All PET data from these three patients had a misalignment of 2-4.5 cm in the lower right thorax between HCT and PET. The breathing artifacts or misalignments were significantly reduced in the PET data that was corrected by ACT. Seven of the 8 patients had a lower diaphragm position on HCT than on ACT, suggesting that patients tended to hold a deeper breath during HCT than the average breathing state.

This study demonstrated the potential mismatch caused by the different breathing states in the HCT and PET data; and the use of ACT has been shown to reduce the breathing artifacts and to improve the tumor quantification. An ideal CT for the AC of the PET data, therefore, will be from the HCT of the anatomy above and below the thorax, and from the ACT of the anatomy in the thorax as suggested in FIG. 7. Current dose of 4D-CT for 5 seconds cine duration will be between 23 and 70 mGray for the mA range of 50 to 150 at 0.5 seconds gantry rotation cycle. This dose level is not a critical issue in radiation therapy planning from which the 8 patients were recruited. For a routine diagnostic procedure, however, this dose may be considered to be high.

As described, the frequency and magnitude of misalignment between HCT and PET data in 100 consecutive PET/CT studies with a limited breath-hold during HCT was analyzed. Forty-nine studies showed a misalignment between HCT and PET, and 29 studies showed a misalignment of more than 2 cm, suggesting that an improvement should be made to reduce the misalignment. Embodiments of the present invention use ACT for the AC of PET data in the thorax to reduce the misalignment due to the different breathing states of the HCT and PET and to improve quantitation of PET data. A main advantage of ACT over HCT is that the temporal resolution, e.g., preferably less than 0.5 seconds, of one breathing cycle in ACT is similar to that of many breathing cycles in PET.

In a study of 13 tumors in 8 patients, 4 tumors in 3 patients were found with an SUV change of more than 50%, and these 3 patients had a misalignment of 2-4.5 cm. The breathing artifacts, shown as white bands in the lower thorax of the PET images were significantly reduced with ACT. The results suggest a better match of ACT and PET than of HCT and PET and a more accurate PET quantitation in the thorax by ACT than by HCT.

In this study, 100 consecutive clinical PET/CT studies were examined for the frequency and magnitude of misalignment at the diaphragm position between the HCT and PET data. The patients were injected with 555-740 MBq of FDG and scanned 1 hour after injection. The HCT data were taken at 120 kV, 300 mA, pitch 1.35:1, 8×2.5 mm collimation, and 0.5 seconds rotation; and the patients were instructed to hold their breaths at mid-expiration during HCT of the thorax. The PET acquisition was 3 minutes per bed. The AC of the PET data was compared with HCT and ACT in 8 additional patients (1 with esophageal cancer and 7 with lung cancer) with 13 tumors. After their PET/CT studies, the 8 patients were scanned by 4D-CT. The 4D-CT data were taken at 120 kV, 50-150 mA, cine duration of one breathing cycle plus 1 second, 8×2.5 mm collimation, and 0.5 seconds rotation cycle. A plurality, e.g., the 10 even, phases of the 4D-CT data were averaged to obtain the ACT for the AC of the PET data. Both the ACT and HCT data were used for the AC of the same PET data.

The results showed that there was a misalignment between the HCT and the PET data in 51 of 100 patient studies, and 29 studies had a misalignment of greater than 2 cm. Nine tumors had differences in SUV between HCT and ACT of less than 30%, and 4 tumors had differences in SUV of more than 50%. The latter 4 tumors were found in the patient with esophageal cancer and two of the patients with lung cancer. The PET data from these three patients had a misalignment of 2 to 4.5 cm from the HCT data. The breathing artifacts were significantly reduced. Seven of the eight patients had a lower diaphragm position on HCT than on ACT, suggesting that the patients tended to hold a deeper breath during HCT than during ACT.

The high rate of misalignment suggested a potential mismatch between the HCT and PET data with the limited breath-hold CT protocol. In the comparison of HCT and ACT, significant differences (>50%) in SUV were due to different breathing states between the HCT and PET data. The PET data corrected by the ACT did not show any breathing artifacts, suggesting that ACT may be more accurate than HCT for the AC of the PET data.

Figure 12:
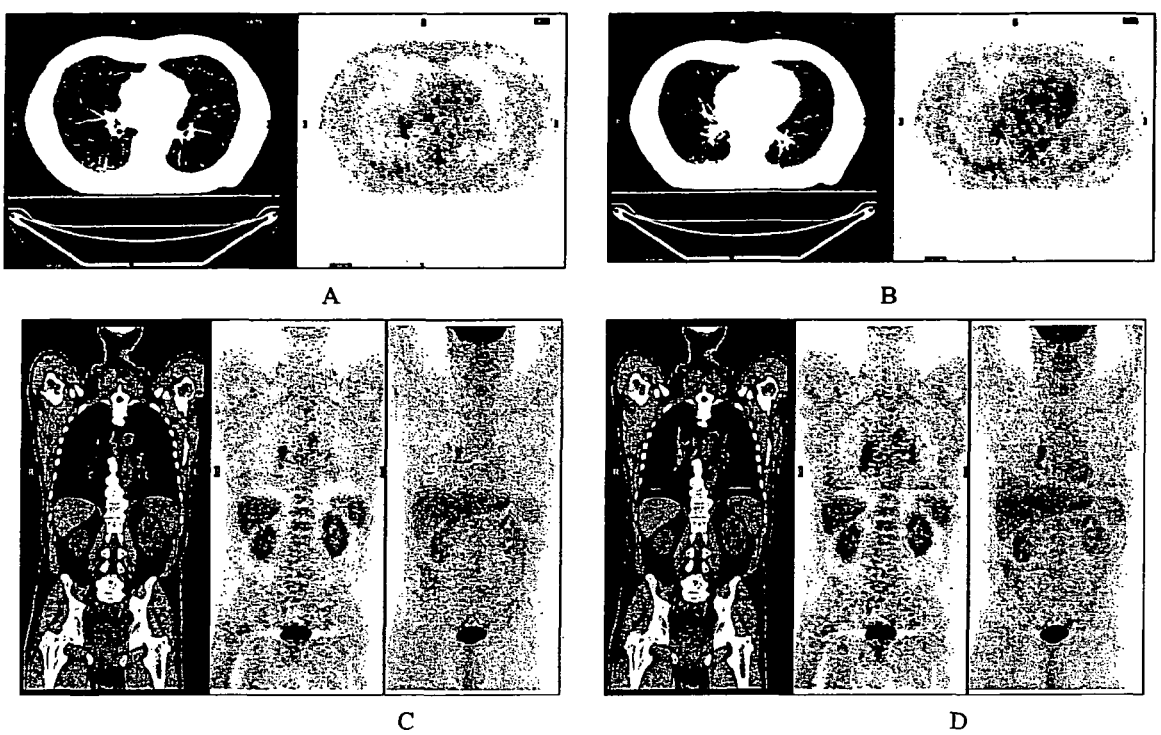
FIGS. 12A, 12B, 12C, and 12D are image data corrections according to embodiments of the present invention.
Figure 14:
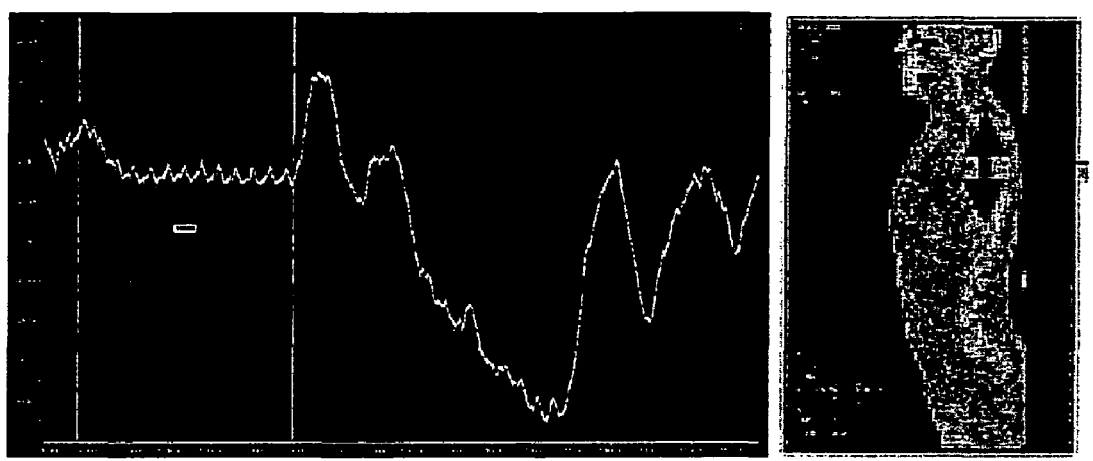
FIG. 14A is image data showing patient breathing signal about 10.5 second of breath hold during the CT scan according to an embodiment of the present invention.
FIG. 14B is image data showing the coverage of breath hold in the helical CT and the 4D-CT coverage over the chest according to embodiments of the present invention.
Figure 15:
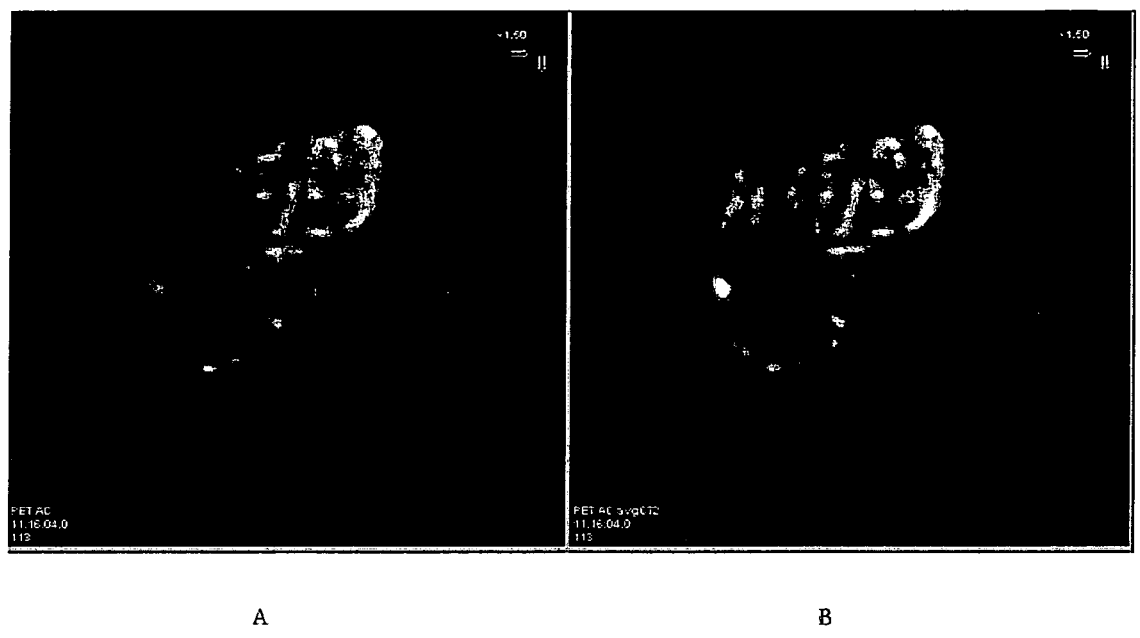
FIG. 15A is image data showing PET data attenuation with helical CT according to embodiments of the present invention.
FIG. 15B is image data showing the PET data of FIG. 15A corrected with the average CT of 4D-CT according to embodiments of the present invention.
Figure 16:
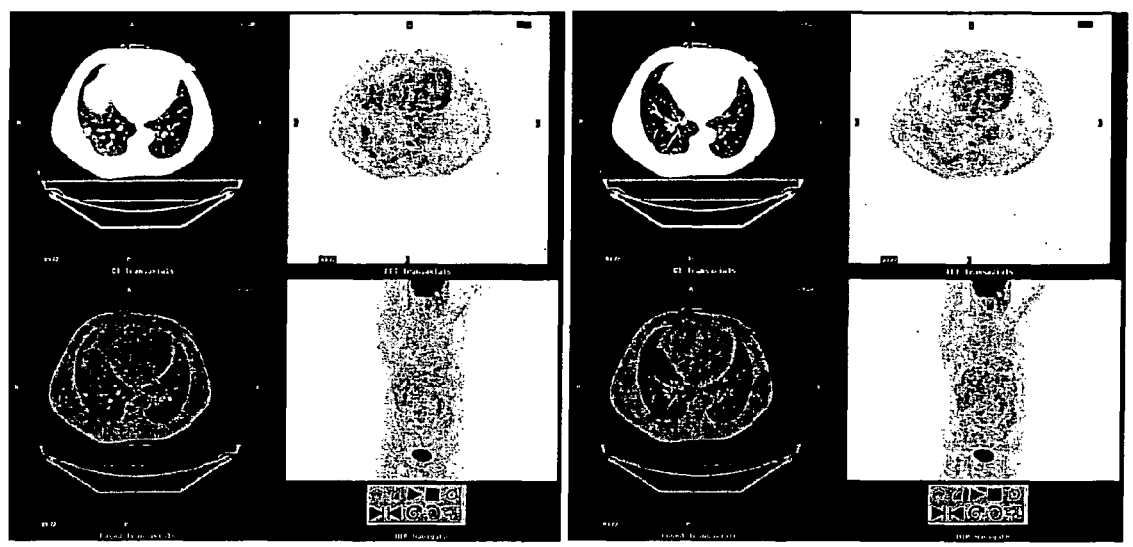
FIG. 16A is image data showing PET-CT fusion with helical CT according to embodiments of the present invention.
FIG. 16B is image data showing PET-CT fusion with average CT according to embodiments of the present invention.
Figure 17:
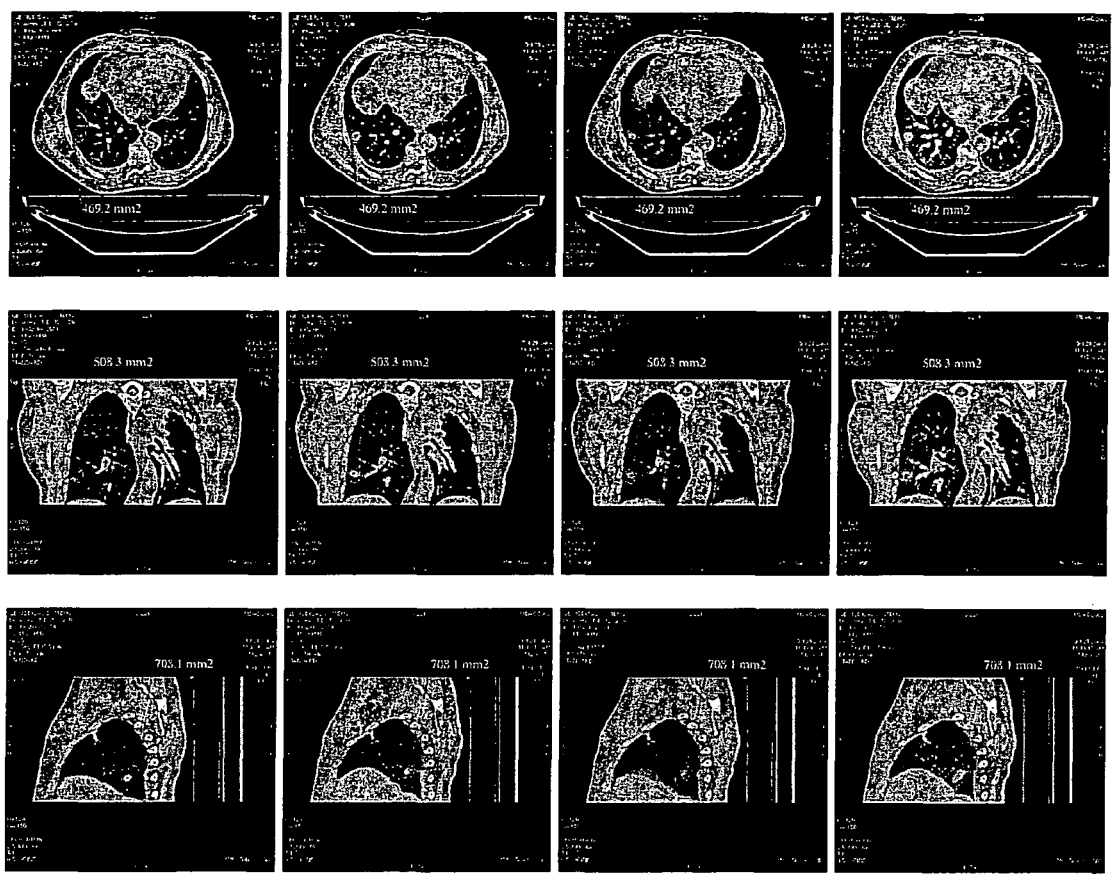
FIG. 17A is image data showing end inspiration CT according to embodiments of the present invention.
FIG. 17B is image data showing end inspiration CT according to embodiments of the present invention.
FIG. 17C is image data showing average CT according to embodiments of the present invention.
FIG. 17D is image data showing MIP CT according to embodiments of the present invention.

As shown in FIGS. 12A-12D, FIG. 12A illustrates the axial HCT and PET data (corrected by HCT) for tumor 10 (patient 5). FIG. 12B illustrates the corresponding axial ACT and PET data (corrected by ACT). The SUVs of HCT-PET and ACT-PET were 4.3 and 7.4, respectively. There was an increase in SUV of 70.1% between HCT-PET and ACT-PET. FIG. 12C illustrates the coronal HCT, HCT-PET, and MIP of HCT-PET data and FIG. 12D illustrates the coronal ACT, ACT-PET, and MIP of ACT-PET data. With the use of ACT, there was a significant reduction in breathing artifacts caused by the different breathing states during HCT and PET. Note that the ACT did not cover the whole liver and was still able to correct for the breathing artifacts. On each image, there is either a cross-hair or an arrow pointing to the tumor location.

As shown in FIGS. 13A-13D, FIG. 13A illustrates the axial HCT and PET data (corrected by HCT) for tumor 11 (patient 6). FIG. 13B illustrates the corresponding ACT and PET data (corrected by ACT). The SUVs of the HCT-PET and the ACT-PET were 1.9 and 3.8, respectively. There was an increase in SUV of 97.4% between HCT-PET and ACT-PET. FIG. 13C illustrates the coronal HCT, HCT-PET, and MIP of HCT-PET data and FIG. 13D illustrates the coronal ACT, ACT-PET, and MIP of ACT-PET data. With the use of ACT, there was a significant reduction in breathing artifacts caused by the different breathing states during HCT and PET. All images except MIP have a cross-hair pointing to the lesion location.

As shown in FIGS. 14A-17D, one NSCLC patient was scanned on a GE DST PET/CT scanner for PET and 4DCT imaginings for tumor staging and radiation therapy treatment planning. The protocol was conducted according to institutional guideline. The patient was 94 kg and scanned at 1 hr 20 minutes after injection of 18.05 mCi of FDG, and instructed to hold breath at mid-expiration during the helical CT scan of 32.9 sec. After 10 seconds of breath-hold in the CT scan, the patient could not comply with the breath hold in the remaining CT scan. After the helical CT, a PET scan of 2D mode and 3 minutes per bed position was conducted. After the PET scan, a 4DCT scan of 2 minutes was performed. An average CT scan was generated from the 4D-CT data for PET attenuation correction, and the results compared with the PET attenuation correction by the helical CT data. The multiphase data of 4D-CT were used for treatment planning in radiation therapy.

An increase of SUV value was observed from 2.29 with helical CT to 3.64 with average CT (59% increase) for the lesion in the right lower lobe. We also observed a lesion motion of about 1 cm between the two phases of end-inspiration and end-expiration. The utility of using the average CT from 4D-CT for attenuation correction has the potential of improving PET images. In addition to that, a maximum intensity projection (MIP) data set from 4D-CT can also be used to assist treatment planning in radiation therapy.

Embodiments in the present invention can also include attenuation correction program product stored on a tangible computer readable medium for correcting emission data upon, for example, PET/CT and SPECT/CT scans used in radiation treatment planning and/or delivery. The program product when operable on a computer can perform much of the method steps described above. For example, according to an embodiment each of the program product, when operable on a computer, the program product can perform various steps including performing a helical CT scan to cover a relatively large area of anatomy and/or performing a cine CT scan to thereby generate an attenuation map for attenuation correction of emission data influenced by body motion of the patient, e.g., respiratory and/or cardiac motion. The steps can also include determining or otherwise implementing an average CT scan responsive to the helical CT or cine CT scans, performing an emission scan to obtain the emission data, and applying attenuation correction to the emission data using the average CT scan. The attenuation corrected emission data can then be exported for use in developing a treatment plan for radiation therapy The step of determining the average CT scan can be performed to average respiratory motion in the CT image to substantially match and average motion in the emission data to thereby improve tumor quantification and localization in the emission data. According to an embodiment of the program product, the step of determining or otherwise implementing an average CT can include the step of averaging a plurality of consecutive low-dose CT images of approximately one breathing cycle to obtain the average CT. When so accomplished, the average CT scan can have a temporal resolution of approximately one breathing cycle. According to another embodiment of the program product, the step of determining or otherwise implementing an average CT can include the step of averaging a plurality of phases of 4D-CT images to define an average CT. When so accomplished, the average CT scan according to this methodology can also result in the temporal resolution of the CT scan, e.g., approximately one breathing cycle, matching the temporal resolution of the PET or SPECT to thereby improve tumor quantification and tumor localization. According to either embodiment of the program product, the step of applying the attenuation correction can include the step of combining the average CT image data with the helical CT image data as shown in FIG. 7, or with the cine CT image data.

According to an embodiment of the program product, the step of averaging can include the step of matching a signal-to-noise ratio of the helical CT scan and average CT scan from either cine or helical scans. According to another embodiment of the program product, the step of averaging can include the step of averaging a plurality of phases of 4D-CT images so that temporal resolution of the average CT scan approximates one breathing cycle. The plurality of phases can include a plurality of respiratory phases in a range of 10 to 20 and/or a plurality of a range of 5 to 10 phases of 4D-CT images per cardiac cycle over the duration of 3 to 10 cardiac cycles of a breathing cycle.

It is important to note that while embodiments of the present invention have been described in the context of a fully functional system implemented through method steps, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: non-volatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and instructions related to the attenuation correction program product and much of the method steps of correcting attenuation on emission data described above.

Embodiments of the present invention include a computer readable medium that is readable by a computer performing attenuation correction on emission data, for example, from a PET/CT or SPECT/CT scanner as known to those skilled in the art. The computer readable medium can include a set of instructions that, when executed by the computer, cause the computer to perform the operations of performing a CT scan, e.g., helical or cine, to generate an attenuation map for attenuation correction of emission data influenced by body motion of the patient, e.g., respiratory and/or cardiac motion. The operations can also include determining or otherwise implementing an average CT scan responsive to the helical CT or cine CT scans. The operation of implementing the average CT scan can be performed to average the respiratory motion in the CT scan to substantially match and average motion in the emission data to thereby improve tumor quantification and localization in the emission data. The operations can also include performing an emission scan to obtain the emission data, and applying attenuation correction to the emission data using the average CT scan. The operations can further include exporting the attenuation corrected emission data for use in developing a treatment plan for radiation therapy.

According to an embodiment of the computer readable medium, the instructions to perform the operation of determining or otherwise implementing an average CT scan can include those to perform the operation of averaging a plurality of consecutive low-dose CT images of approximately one breathing cycle to obtain the average CT scan. When so accomplished, the average CT scan can have a temporal resolution of approximately one breathing cycle. According to another embodiment of the computer readable medium, the instructions to perform the operation of determining or otherwise implementing an average CT scan can include instructions to perform the operation of averaging a plurality of phases of 4D-CT images to define an average CT. When so accomplished, the average CT scan according to this methodology can also result in the temporal resolution of the CT scan, e.g., approximately one breathing cycle, matching the temporal resolution of the PET or SPECT to thereby improve tumor quantification and tumor localization. In either of the above described embodiments, the operation of applying the attenuation correction can include the combining the average CT image data with the helical CT image data as shown in FIG. 7, or with the cine CT image data, and combining the ACT with helical or are CT image data.

According to an embodiment of the computer readable medium, the operation of averaging can further include matching a signal-to-noise ratio of helical CT scan and average CT scan from either cine or helical scans. According to another embodiment of the computer readable medium, the operation of averaging can include averaging a plurality of phases of 4D-CT images so that temporal resolution of the average CT approximates one breathing cycle. The plurality of phases can include a plurality of respiratory phases in a range of 10 to 20 and/or a plurality of a range of 5 to 10 phases of 4D-CT images per cardiac cycle over the duration of 3 to 10 cardiac cycles of a breathing cycle. Either or both the respiratory phases and the cardiac phases can be used to form the average CT scan.

This application is related to U.S. Provisional Application No. 60/662,732, filed on Mar. 17, 2005, incorporated herein by reference in its entirety.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

The invention claimed is:

1. A method of attenuation correction of emission image data in combined PET/CT examinations, the method comprising:
   acquiring emission image data having attenuation therein;
   averaging a plurality of phases of 4D-CT images so that temporal resolution of an average CT image approximates one breathing cycle, wherein the temporal resolution of the average CT image approximates the temporal resolution of the emission image data, the emission image data having a temporal resolution of an average of multiple breathing cycles; and
   using the average CT image to correct the attenuation in the emission image data.

2. A method as defined in claim 1, wherein the plurality of phases comprises a plurality of respiratory phases in a range of 10 to 20, and wherein the PET/CT examination includes SPECT/CT.

3. A method as defined in claim 1, wherein the plurality of phases comprises a range of 5 to 10 phases of 4D-CT images per cardiac cycle over the duration of 3 to 10 cardiac cycles of a breathing cycle to further obtain a result defining the average CT image.

4. A method of enhancing PET imaging on a PET/CT scanner, the method comprising:
   generating an average CT scan responsive to 4D-CT emission image data such that temporal resolution of the average CT scan approximates one breathing cycle to thereby correct attenuation in PET emission image data;
   wherein the average CT scan includes an average of cardiac motion and an average of respiratory motion to thereby approximate the average cardiac and respiratory motion in the PET emission image data.

5. A method as defined in claim 4, wherein the average CT scan includes a plurality of phases, to thereby obtain multi-phase data, and the method further includes using the multi-phase data for treatment planning in radiation therapy.

6. A method as defined in claim 4, further comprising obtaining the average CT scan by either a cine 4D-CT scan or a helical 4D-CT scan.

7. A method of attenuation correction in a CT scanner, the method comprising:
  acquiring PET emission image data;
  averaging a plurality of consecutive low-dose CT images of approximately one breathing cycle to thereby obtain an average CT image; and
  using the average CT image to correct attenuation in the PET emission image data.

8. A method as defined in claim 7, further comprising using the corrected PET emission image data for treatment planning in radiation therapy.

9. A method as defined in claim 7, wherein the averaging includes matching a signal-to-noise ratio of helical CT image data and the average CT image from either cine or slow helical scans.

10. A method as defined in claim 7, wherein the averaging occurs before or after image reconstruction.

11. A method as defined in claim 7, further comprising combining the average CT image with helical CT (HCT) image data.

12. A program product stored on a non-transitory computer readable medium, the program product when operable on a computer performing the steps of:
  averaging a plurality of phases of 4D-CT images to define an average CT (ACT);
  combining the ACT with HCT image data; and
  using the ACT to correct attenuation of PET emission data.

13. Program product stored on a non-transitory computer readable medium, the program product when operable on a computer performing the steps of:
  performing a CT scan to generate an image attenuation map for attenuation correction of emission data influenced by body motion of a patient;
  determining an average CT scan responsive to the CT scan;
  performing an emission scan to obtain the emission data;
  applying attenuation correction to the emission data using the average CT scan;
  wherein the step of performing the CT scan includes performing one of the following: a helical CT scan or a cine CT scan;
  wherein the body motion results from one of the following: respiratory motion or cardiac motion; and
  wherein determining the average CT is performed to average respiratory motion in the CT scan to substantially match and average motion in the emission data to thereby improve tumor quantification and localization in the emission data.

14. Program product as defined in claim 13, wherein the step of determining an average CT scan includes the step of averaging a plurality of consecutive low-dose CT images of approximately one breathing cycle to obtain an average CT scan having a temporal resolution of approximately one breathing cycle.

15. Program product as defined in claim 14, wherein the averaging includes matching a signal-to-noise ratio of the helical CT scan and the average CT scan from either cine or helical scans.

16. Program product as defined in claim 13,
  wherein the CT scan is a helical CT scan; and
  wherein the step of applying the attenuation correction includes the step of combining the average CT with helical CT image data.

17. Program product as defined in claim 16, further comprising the step of exporting the attenuation corrected emission data to a radiation therapy treatment plan.

18. A non-transitory computer readable medium storing a computer program that is readable by a computer performing attenuation correction on emission data, the computer readable medium comprising a set of instructions that, when executed by the computer, cause the computer to perform the following operations:
  performing a CT scan to generate an image attenuation map for attenuation correction of emission data influenced by body motion of a patient;
  determining an average CT scan responsive to the CT scan;
  performing an emission scan to obtain the emission data;
  applying attenuation correction to the emission data using the average CT scan;
  wherein the operation of performing the CT scan includes performing one of the following: a helical CT scan or a cine CT scan;
  wherein the body motion results from one of the following: respiratory motion or cardiac motion; and
  wherein determining the average CT is performed to average respiratory motion in the CT scan to substantially match and average motion in the emission data to thereby improve tumor quantification and localization in the emission data.

19. A computer readable medium as defined in claim 18, wherein the operation of determining an average CT scan includes averaging a plurality of consecutive low-dose CT images of approximately one breathing cycle to obtain an average CT scan having a temporal resolution of approximately one breathing cycle.

20. A computer readable medium as defined in claim 18, wherein the operation of determining an average CT scan includes averaging a plurality of phases of 4D-CT images so that temporal resolution of the average CT approximates one breathing cycle.

21. A computer readable medium as defined in claim 18, wherein the CT scan is a helical CT scan; and
  wherein the operation of applying the attenuation correction includes combining the average CT with helical CT image data.

22. A computer readable medium as defined in claim 21, wherein the instructions further comprise those to perform the operation of exporting the attenuation corrected emission data to a radiation therapy treatment plan.

* * * * *

UNITED STATES PATENT AND TRADEMARK OFFICE
CERTIFICATE OF CORRECTION

PATENT NO. : 7,787,675 B2  Page 1 of 1
APPLICATION NO. : 11/384029
DATED : August 31, 2010
INVENTOR(S) : Pan et al.

It is certified that error appears in the above-identified patent and that said Letters Patent is hereby corrected as shown below:

Title Page, Item (54), in the Title, delete "AND SPEC/CT" and substitute therefore
-- AND SPECT/CT --.

Signed and Sealed this
Twenty-eighth Day of December, 2010

David J. Kappos
*Director of the United States Patent and Trademark Office*